United States Patent
Saadeh et al.

(10) Patent No.: US 12,291,138 B2
(45) Date of Patent: May 6, 2025

(54) TOWING DOLLY ASSEMBLY

(71) Applicant: Shield Recovery LLC, Vallejo, CA (US)

(72) Inventors: Isa Saadeh, Benicia, CA (US); Gabriel Cree, Antioch, CA (US)

(73) Assignee: Shield Recovery LLC, Vallejo, CA (US)

( * ) Notice: Subject to any disclaimer, the term of this patent is extended or adjusted under 35 U.S.C. 154(b) by 231 days.

(21) Appl. No.: 17/723,014

(22) Filed: Apr. 18, 2022

(65) Prior Publication Data
US 2023/0331137 A1    Oct. 19, 2023

(51) Int. Cl.
*B60P 3/12*    (2006.01)
(52) U.S. Cl.
CPC .................. *B60P 3/127* (2013.01)
(58) Field of Classification Search
CPC ........................................ B60P 3/127
See application file for complete search history.

(56) References Cited

U.S. PATENT DOCUMENTS

| | | | |
|---|---|---|---|
| 4,664,399 A | | 5/1987 | Mobley |
| 4,696,484 A | * | 9/1987 | Casey ............... B60S 13/00 |
| | | | 414/427 |
| 4,846,484 A | * | 7/1989 | Nekola ............... B66F 5/02 |
| | | | 280/43.11 |
| 4,900,215 A | * | 2/1990 | Nowell ............... B60B 29/002 |
| | | | 254/8 R |
| 5,941,675 A | * | 8/1999 | Orr ............... B66F 5/02 |
| | | | 414/427 |
| 7,275,753 B1 | * | 10/2007 | Ceccarelli ............... B60P 3/127 |
| | | | 414/427 |
| 7,673,887 B2 | | 3/2010 | Hassell |
| 7,815,201 B2 | * | 10/2010 | Ceccarelli, III ........ B60P 3/127 |
| | | | 414/428 |
| 8,448,972 B1 | | 5/2013 | Belcher et al. |

(Continued)

FOREIGN PATENT DOCUMENTS

CA    2596143 C    2/2008

OTHER PUBLICATIONS

Collins Dollies, URL :<https://www.collinsmfgcorp.com/hi-speed-dollies>, retrieved Nov. 26, 2021; SLZ Hi-Speed Dolly (3 pages).

(Continued)

*Primary Examiner* — Erez Gurari
(74) *Attorney, Agent, or Firm* — Quarles & Brady LLP

(57) ABSTRACT

A towing dolly assembly includes a beam having first and second ends and a longitudinal axis, first and second spindle assemblies arranged at the first and second ends, respectively, and first and second axle cradle assemblies arranged adjacent to the first and second ends, respectively. The first and second spindle assemblies include first and second cam locks and first and second locking arms, respectively. The first and second cam locks are fixedly attached to a first side of the beam. The first locking arm is pivotable about a first axis extending perpendicular to the longitudinal axis between the first side and a second side of the beam. The second locking arm is pivotable about a second axis extending perpendicular to the longitudinal axis between the first and second sides of the beam.

20 Claims, 9 Drawing Sheets

(56) References Cited

U.S. PATENT DOCUMENTS

| | | | |
|---|---|---|---|
| 8,657,305 B1* | 2/2014 | Hassell | B60P 3/127 |
| | | | 280/43.21 |
| 8,910,957 B1 | 12/2014 | Hassell | |
| 9,896,015 B2 | 2/2018 | Neveu et al. | |
| D907,530 S | 1/2021 | Craze et al. | |
| 11,193,541 B1* | 12/2021 | Hassell | F16C 33/102 |
| 2008/0069674 A1* | 3/2008 | Hassell | B62B 5/0083 |
| | | | 414/428 |
| 2009/0250890 A1* | 10/2009 | Ceccarelli, III | B60P 3/127 |
| | | | 280/79.4 |
| 2015/0290972 A1 | 10/2015 | Minor et al. | |
| 2016/0059913 A1 | 3/2016 | Berger et al. | |
| 2023/0331137 A1* | 10/2023 | Saadeh | B60P 3/127 |

OTHER PUBLICATIONS

International Search Report issued in International Application PCT/US23/18956 dated Jul. 18, 2023 (2 pages).
Written Opinion issued in International Application PCT/US23/18956 dated Jul. 18, 2023 (7 pages).

* cited by examiner

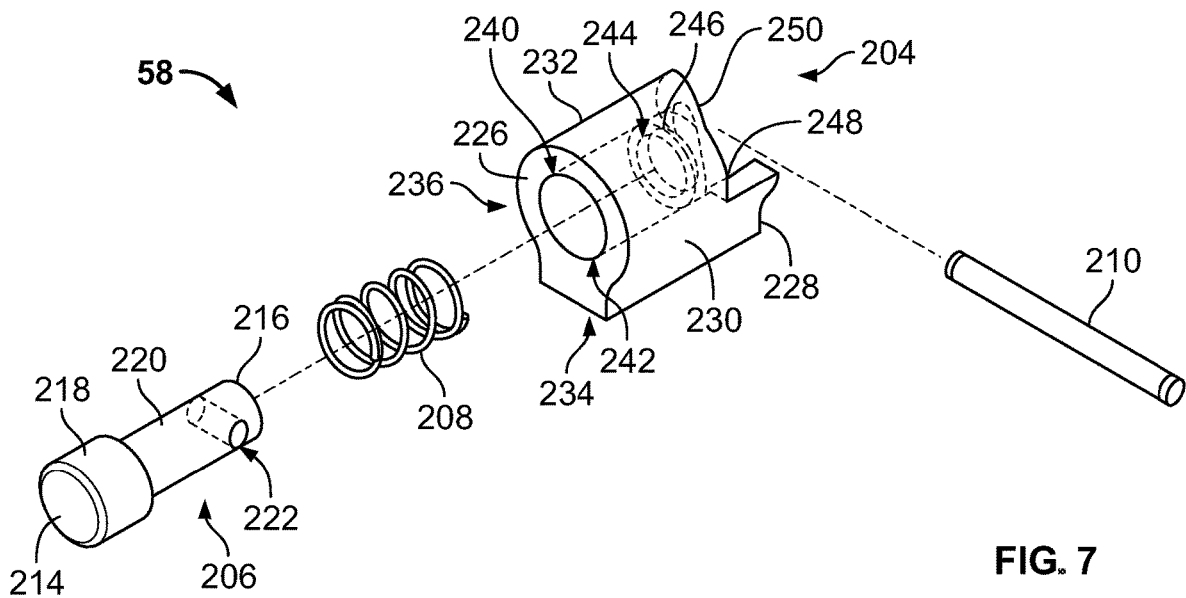
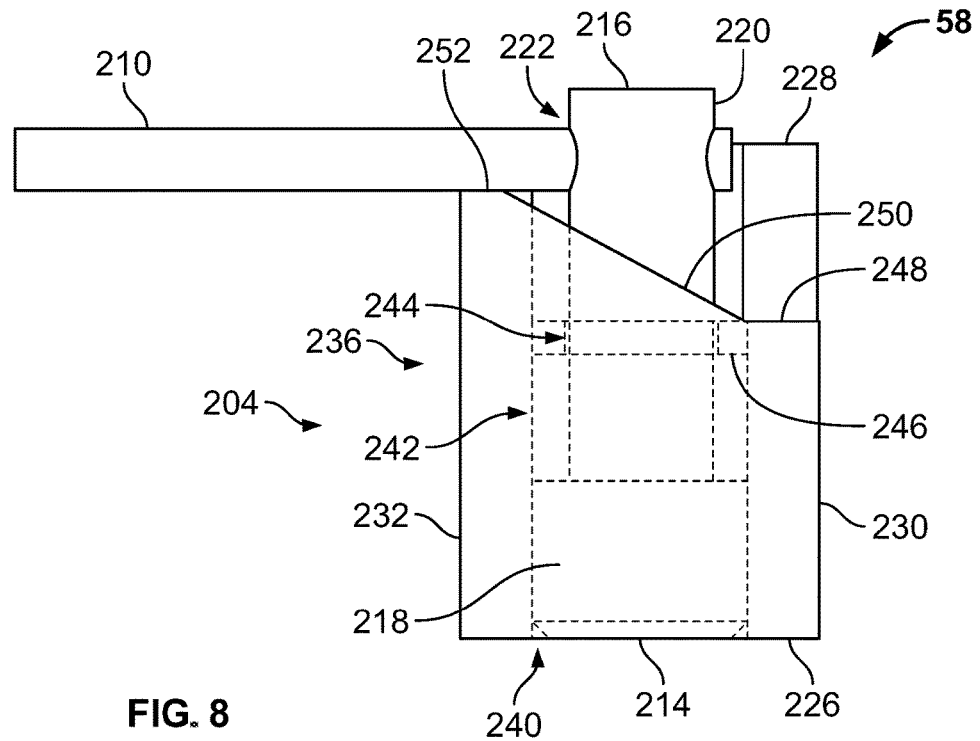

TOWING DOLLY ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present disclosure relates to a towing dolly assembly and more specifically to concepts related to towing dolly cradle assemblies that are configured to tow an automobile by lifting one or more axles of the automobile from a ground surface.

Conventional towing dolly cradle assemblies include two towing dolly assemblies and two axle cradle tubes that engage one or more wheels of an axle of an automobile to be towed and one or more axle cradle assemblies of the two towing dolly assemblies. Conventional towing dolly assemblies are moveable from a retracted configuration being near the ground surface to an extended configuration being raised from the ground surface. However, conventional axle cradle assemblies of towing dolly assemblies are configured such that engaging members of the axle cradle tubes must be lifted and moved between two or more receiving slots of the axle cradle assembly based on a diameter of the one or more wheels of the automobile. This required lifting for mere adjustment of the axle cradle tubes while the towing dolly cradle assembly is being attached to an automobile can be particularly bothersome in some applications.

Further, conventional towing dolly assemblies include spindle assemblies pivotably attached to a beam, which have rotating locking arms attached to one or more wheels of the towing dolly assembly. These rotating locking arms are rotatable about an axis extending above the beam and, thus, require locking arms having a substantial length in order to provide clearance from the ground surface when the towing dolly assembly is in the extended configuration. In addition, the locking arms having a required substantial length can result in an increased weight of the locking arms which can increase an overall weight of the towing dolly assembly. A towing dolly assembly having an increased overall weight can be burdensome on a user installing a towing dolly cradle assembly upon an automobile to be towed.

Therefore, a towing dolly assembly in which a user can adjust an axle cradle tube engaged with the towing dolly assembly without requiring substantial lifting of the tube, while, at the same time, providing a reduction of a weight of the towing dolly assembly may be desired.

BRIEF SUMMARY OF THE INVENTION

To this end, in at least some embodiments of the present disclosure, a towing dolly assembly is provided that can include an elongated beam having a first end, a second end opposite the first end, and a longitudinal axis extending through the first and second ends, a first spindle assembly arranged on the first end of the beam that can include a first cam lock and a first locking arm, and a second spindle assembly arranged on the second end of the beam that can include a second cam lock and a second locking arm. The towing dolly assembly can further include a first axle cradle assembly arranged on the beam adjacent to the first end, and a second axle cradle assembly arranged on the beam adjacent to the second end. The first and second cam locks can be fixedly attached to a first side of the beam, and the first and second axle cradle assemblies can be fixedly attached to a second side of the beam that is opposite the first side the beam. The first and second locking arms can be pivotably attached to the beam, such that the first locking arm is pivotable about a first axis that extends perpendicular to the longitudinal axis between the first and second sides of the beam, and the second locking arm is pivotable about a second axis that extends perpendicular to the longitudinal axis between the first and second sides of the beam. The towing dolly assembly can be configured to be moveable between a retracted configuration, in which the first and second locking arms are in a first position, and an extended configuration, in which the first and second locking arms are in a second position.

In some embodiments, the first axle cradle assembly of the tow dolly assembly can include a plurality of mounting plates and a crossbar. The plurality of mounting plates can have first ends fixedly attached to the second side of the beam and second ends that are spaced downwardly from the first ends. The crossbar can be fixedly attached to a first side of the plurality of mounting plates and adjacent to the second ends of the plurality of mounting plates. In some embodiments, the first sides of the plurality of mounting plates of the first axle cradle assembly can extend downwardly from the first ends, and the first sides of the plurality of mounting plates do not contact a top side of the crossbar. In some embodiments, the plurality of mounting plates of the first axle cradle assembly can include at least two outer mounting plates arranged toward the first end of the beam and an inner mounting plate arranged adjacent to the outer mounting plates toward the second end of the beam. In some embodiments, the inner mounting plate can include a support leg that is configured to contact a third side of the beam that is adjacent to the first side of the beam. In some embodiments, the inner mounting plate can include a crossbar channel that can be configured to contact at least the top side of the crossbar, and the outer mounting plates can include crossbar protrusions that can be configured such that the first sides of the outer mounting plates do not contact the top side of the crossbar.

In some embodiments, a towing dolly assembly can include first and second cam locks that are mounted directly on a surface of a first side of a beam. In some embodiments, a first spindle assembly of a towing dolly assembly can include a first ratcheting assembly that can be configured to releasably hold a first locking arm at an angle relative to a longitudinal axis of the beam between first and second positions. In some embodiments, a first locking arm of a towing dolly assembly can include a first locking plate arranged on a third side of the beam that is adjacent to both first and second sides of the beam, and a second locking plate arranged on a fourth side of the beam that is opposite the third side of the beam.

In some embodiments, a first locking arm of a first spindle assembly of a towing dolly assembly can include a first locking plate arranged on a third side of a beam that is adjacent to both first and second sides of the beam, and a second locking plate arranged on a fourth side of the beam that opposite the third side of the beam. A first cam lock can be arranged such that a first lock pin of the first cam lock faces toward the fourth side of the beam, and the first cam lock can be configured such that the first lock pin is moveable between a retracted position and an extended position. The second locking plate of the first locking arm can include a first opening, a second opening, and a recess. The first opening can be arranged toward a first end of the second locking plate and can be configured to receive the first lock pin of the first cam lock in the extended position to releasably hold the first spindle assembly when the towing dolly assembly is in the extended configuration. The second opening can be arranged between the first opening and a second end of the second locking plate opposite the first end and adjacent to a first side of the second locking plate, and can be configured to engage the first lock pin of the first cam lock as the towing dolly assembly is moved between the retracted configuration and the extended configuration. The recess can be defined on a second side of the second locking plate opposite the first side, and can be configured to receive the first locking pin of the first cam lock in the extended position to releasably hold the first spindle assembly when the towing dolly is in the retracted configuration. In some embodiments, the second opening of the second locking plate can be a curved slot having a radius centered on the third opening of the second locking plate.

In some embodiments, a first opening of a first locking plate of a first locking arm can be arranged toward a first end of the first locking plate. The first locking plate can further include a second opening arranged toward a second end of the first locking plate opposite the first end. The second locking plate can further include a fourth opening arranged between the second end and the third opening of the second locking plate. The first spindle assembly can further include a first axle that can be received by the second opening of the first locking plate and the fourth opening of the second locking plate. The first axle can be configured to releasably receive a first wheel assembly of the towing dolly assembly.

In some embodiments, the towing dolly assembly can be part of a towing dolly cradle assembly. The towing dolly cradle assembly can include a first towing dolly assembly, a second towing dolly assembly, a first axle cradle tube having first ends, second ends opposite the first ends, and a first longitudinal axis, and a second axle cradle tube having first ends, second ends opposite the first ends, and a second longitudinal axis. The first and second towing dolly assemblies can be arranged opposing each other such that the longitudinal axes of the beams of the first and second towing dolly assemblies are substantially parallel to each other. The first and second axle cradle tubes can be arranged between the first and second towing dolly assemblies such that the first and second longitudinal axes of the first and second axle cradle tubes are substantially perpendicular to the longitudinal axes of the beams of the first and second towing dolly assemblies. The first axle cradle tube can include a first engaging member and a second engaging member. The first engaging member of the first axle cradle tube can be arranged at the first end and can be configured to releasably engage the first axle cradle assembly of the first towing dolly assembly. The second engaging member of the first axle cradle tube can be arranged at the second end and can be configured to releasably engage the second axle cradle assembly of the second towing dolly assembly. The second axle cradle tube can include a first engaging member and a second engaging member. The first engaging member of the second axle cradle tube can be arranged at the first end and can be configured to releasably engage the second axle cradle assembly of the first towing dolly assembly. The second engaging member of the second axle cradle tube can be arranged at the second end and can be configured to releasably engage the first axle cradle assembly of the second towing dolly assembly.

In other aspects the present disclosure, a towing dolly assembly is provided that can include an elongated beam having a first end, a second end opposite the first end, and a longitudinal axis extending through the first and second ends, a first locking arm pivotably mounted to the beam toward the first end, a second locking arm pivotably mounted to the beam toward the second end, and an axle cradle assembly arranged on the beam between the first and second ends. The first locking arm can be pivotable about a first axis that can extend through the beam transversely to the longitudinal axis and adjacent to the first end of the beam. The second locking arm can be pivotable about a second axis that can extend through the beam transversely to the longitudinal axis and adjacent to the second end of the beam. The towing dolly assembly can be configured to be moveable between a retracted configuration, in which the first and second locking arms are in a first position, and an extended configuration, in which the first and second locking arms are in a second position.

In some embodiments, the towing dolly assembly can further include a first cam lock and a second cam lock. The first cam lock can be fixedly attached directly to a surface of a first side of the beam and can be arranged toward the first end of the beam. The first cam lock can be configured to engage the first locking arm. The second cam lock can be fixedly attached directly to the surface of the first side of the beam and can be arranged toward the second end of the beam. The second cam lock can be configured to engage the second locking arm.

In some embodiments, the axle cradle assembly of the towing dolly can include a plurality of mounting plates and a crossbar. The plurality of mounting plates can have first ends that can be fixedly attached to a second side of the beam opposite the first end of the beam, and second ends that can be spaced downwardly from the first ends. The crossbar can be fixedly attached to first sides of the plurality of mounting plates and adjacent to the second ends of the plurality of mounting plates. The first sides of the plurality of mounting plates can extend downwardly from the first ends to a rear side of the crossbar, such that the first sides of the plurality of mounting plates do not contact a top side of the crossbar. In some embodiments, the axle cradle assembly can include a first axle cradle assembly arranged toward the first end of the beam, and a second axle cradle assembly arranged toward the second end of the beam.

In further aspects, the present disclosure provides a towing dolly assembly that can include an elongated beam having a first end, a second end opposite the first end, and a longitudinal axis extending through the first and second ends, a first spindle assembly that can be arranged on the first end of the beam that can include a first cam lock, a first locking arm, and a first ratcheting assembly, and a second spindle assembly that can be arranged on the second end of the beam and that can include a second cam lock, a second locking arm, and a second ratcheting assembly. The towing dolly assembly can further include a first axle cradle assembly and a second axle cradle assembly. The first axle cradle assembly can be arranged toward the first end of the beam and can include a plurality of mounting plates and a first crossbar. The plurality of mounting plates of the first axle cradle assembly can have first ends fixedly attached to a second side of the beam and second ends extending downwardly from the first ends. The first crossbar can be fixedly attached to first sides of the mounting plates and adjacent to the second ends of the mounting plates of the first axle cradle assembly. The second cradle assembly can be arranged toward the second end of the beam and can include a plurality of mounting plates and a second crossbar. The plurality of mounting plates of the second axle cradle assembly can have first ends fixedly attached to the second side of the beam and second ends extending downwardly from the first ends. The second crossbar can be fixedly attached to first sides of the mounting plates and adjacent to the second ends of the mounting plates of the second axle cradle assembly. The first sides of the pluralities of mounting plates of the first and second axle cradle assemblies can extend downwardly from the first ends to rear sides of the first and second crossbars, respectively, such that the first sides of the pluralities of mounting plates do not contact top sides of the first and second crossbars, respectively. The first and second cam locks can be fixedly attached directly to a surface of a first side of the beam opposite the second side and can be configured to engage the first and second locking arms, respectively. The first and second locking arms can be pivotably attached to the beam, such that the first locking arm is pivotable about a first axis that can extend perpendicular to the longitudinal axis between the first and second sides of the beam, and the second locking arm is pivotable about a second axis that can extend perpendicular to the longitudinal axis between the first and second sides of the beam. The towing dolly assembly can be configured to be moveable between a retracted configuration, in which the first and second locking arms are in a first position, and an extended configuration, in which the first and second locking arms are in a second position. The first and second ratcheting assemblies can be configured to releasably hold the first and second locking arms, respectively, at an angle relative to the longitudinal axis of the beam between the first and second positions.

In some embodiments, the plurality of mounting plates of the first axle cradle assembly can include at least two outer mounting plates that can be arranged toward the first end of the beam and an inner mounting plate that can be arranged toward the second end of the beam. The plurality of mounting plates of the second axle cradle assembly can include at least two outer mounting plates that can be arranged toward the second end of the beam and an inner mounting plate that can be arranged toward the first end of the beam. The outer mounting plates of the first and second axle cradle assemblies can include a support leg and a crossbar channel. The support legs of the outer mounting plates can be configured to contact a third side of the beam that is adjacent to the second side of the beam. The crossbar channels of the outer mounting plates can be configured to contact at least the top sides of the crossbars.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

BRIEF DESCRIPTION OF THE SEVERAL VIEWS OF THE DRAWINGS

FIG. 7 is a perspective exploded view of a first cam lock of the towing dolly assembly of FIG. 1;

FIG. 8 is a top plan view of a first cam lock of the towing dolly assembly of FIG. 1 with a lock pin in a retracted position;

Figure 1:
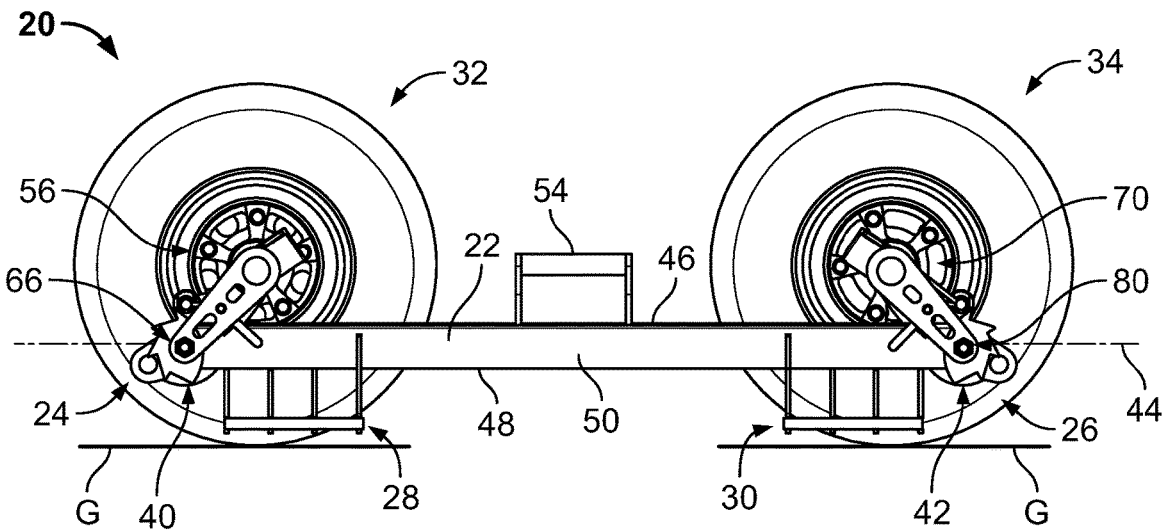
FIG. 1 is a front plan view of a towing dolly assembly in a retracted configuration that is consistent with at least some aspects of the present disclosure.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The term "about," as used herein, refers to variation in the numerical quantity that may occur, for example, through typical measuring and manufacturing procedures used for towing dolly assemblies or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about"

and "approximately" refer to a range of values ±5% of the numeric value that the term precedes.

Further, as used herein, unless otherwise defined or limited, directional terms are used for convenience of reference for discussion of particular figures or examples. For example, references to "downward," or other directions, or "lower," or other positions, may be used to discuss aspects of a particular example or figure, but do not necessarily require similar orientation or geometry in all installations or configurations. The terms "first," "second," "third," etc. may be used herein to describe various elements, components, regions, and/or sections. These elements, components, regions, and/or sections should not be limited by these terms. These terms may be only used to distinguish one element, component, region, or section from another element, component, region, or section. Terms such as "first," "second," and other numerical terms do not imply a sequence or order unless clearly indicated by context. Thus, a first element, component, region, or section discussed below could be termed a second element, component, region, or section without departing from the teachings of the example configuration.

Figure 2:
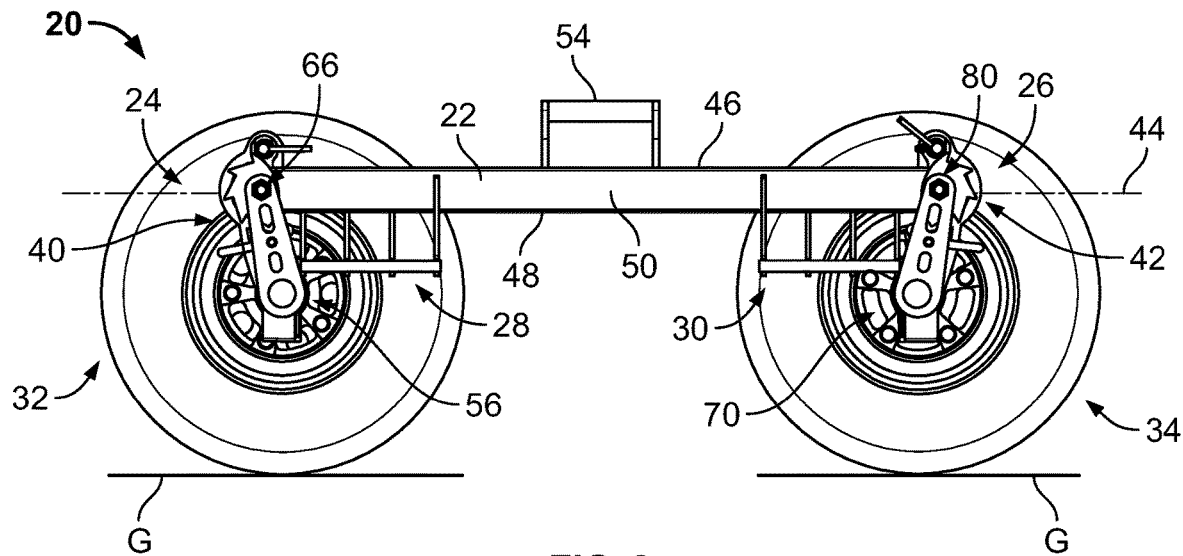
FIG. 2 is a front plan view of the towing dolly assembly of FIG. 1 in an extended configuration.
Figure 3:
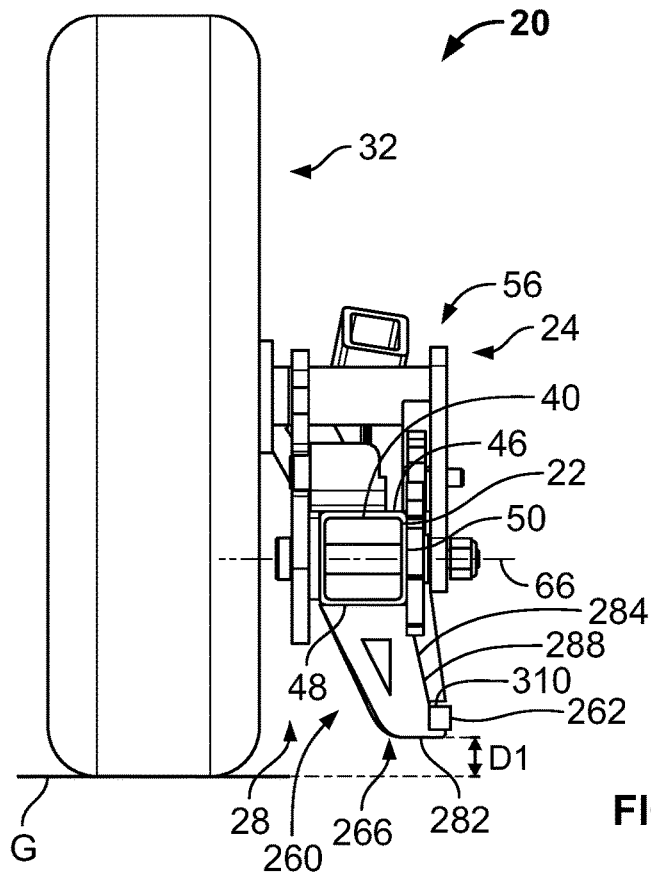
FIG. 3 is a left side view of the towing dolly assembly of FIG. 1 in a retracted configuration.
Figure 4:
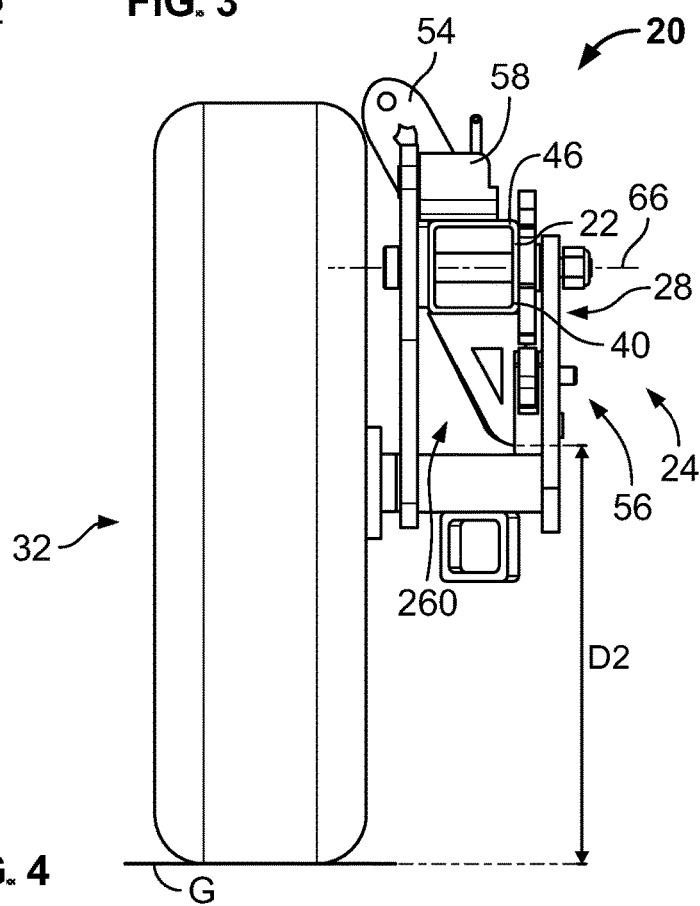
FIG. 4 is a left side view of the towing dolly assembly of FIG. 1 in an extended configuration.

Referring now to the drawings wherein like reference numerals correspond to similar elements throughout the several views and, more specifically, referring to FIGS. 1-11, the present disclosure will be described in the context of an exemplary towing dolly assembly 20 including, among other components, an elongated beam 22, a first spindle assembly 24, a second spindle assembly 26, a first axle cradle assembly 28, a second axle cradle assembly 30, a first wheel assembly 32, and a second wheel assembly 34. Referring specifically to FIGS. 1-4, the towing dolly assembly 20 is configured to be moveable between a first or retracted configuration (as shown in FIGS. 1 and 3) and a second or extended configuration (as shown in FIGS. 2 and 4). With the towing dolly assembly 20 in the retracted configuration (as shown in FIGS. 1 and 3), the first and second cradle assemblies 28, 30 of the towing dolly assembly 20 are at a first distance D1 (see FIG. 3) from a ground surface G. With the towing dolly assembly 20 in the extended configuration (as shown in FIGS. 2 and 4), the first and second cradle assemblies 28, 30 of the towing dolly assembly 20 are at a second distance D2 (see FIG. 4) from the ground surface G.

In some applications, it may be beneficial to increase a change in a height from a ground surface of a towing dolly assembly from a retracted position to an extended configuration, i.e., the difference between the second distance D2 and the first distance D1 in the illustrated embodiment, in order to provide clearance of an automobile to be towed from the ground surface. Accordingly, in some embodiments, the towing dolly assembly 20 is configured such that a ratio between the first distance D1 and the second distance D2 is about 1:3, is about 1:4, or is about 1:5. Relatedly, in some applications, it may be beneficial to minimize a distance of a towing dolly assembly from a ground surface when the towing dolly assembly is in a retracted configuration while being attached to an automobile to be towed. Accordingly, in some embodiments, the towing dolly assembly 20 is configured such the first distance D1 is in a range of about 12 millimeters (mm) to about 200 mm, in a range of about 15 mm to about 100 mm, or in a range of about 12 mm to about 60 mm.

The elongated beam 22 of the towing dolly assembly 20 has a first end 40, a second end 42 opposite the first end 40, and a longitudinal axis 44 extending through the first and second ends 40, 42. Referring specifically to FIGS. 3 and 4, in the illustrated embodiment, the beam 22 has a cross-section that is generally square shaped with an opening therethrough, and as such, has a first or top side 46, a second or bottom side 48 opposite the top side 46, a third or front side 50 adjacent and perpendicular to both the top and bottom sides 46, 48, and a fourth or rear side 52 opposite the front side 50. In some embodiments, the beam 22 is a 2 inch by 2 inch beam having a ⅛ inch thickness. The beam 22 further includes a handle 54 (see FIGS. 1, 3, and 4) arranged on the top side 46 of the beam 22 and that is configured to be grasped by user in order to more easily move or transport the towing dolly assembly 20.

In some embodiments, the beam 22 has a cross-section that is circular, elliptical, or a different polygonal shape. In some embodiments, the beam 22 can be non-elongated. The beam 22 may be comprised of a metal or metal alloy material. In some embodiments, the beam 22 may be comprised of a material and may have a cross-sectional shape that together provide sufficient strength properties of the beam 22 for various applications while minimizing a weight of the beam 22. For example, in some embodiments, the beam 22 can be comprised of a material and have a cross-sectional shape that are configured such that the beam 22 has a weight in a range of about 10 pounds (lbs) to about 80 lbs and can support a distributed load applied near the first and second ends 40, 42 in a direction perpendicular to the longitudinal axis 44 in a range of about 500 lbs to about 10,000 lbs.

Figure 5:
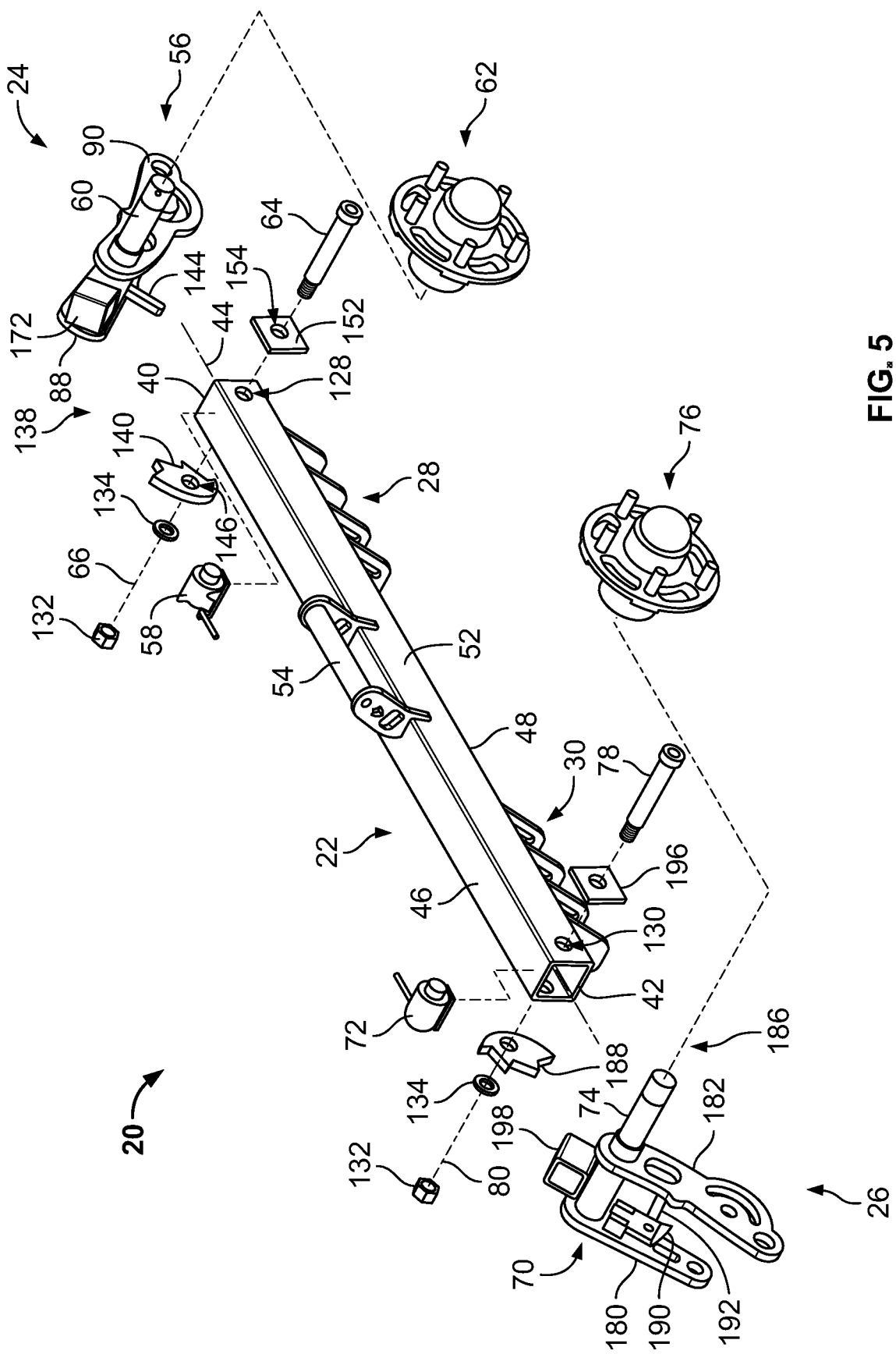
FIG. 5 is a perspective exploded view of the towing dolly assembly of FIG. 1.

Referring now to FIG. 5, the towing dolly assembly 20 is shown in an exploded configuration. The first spindle assembly 24 is arranged on the beam 22 proximal to the first end 40 of the beam 22. The first spindle assembly 24 includes a first locking arm 56, a first cam lock 58, a first axle 60, a first wheel hub 62, and a first fastener 64. The first locking arm 56 is pivotable about a first axis 66 that extends perpendicular to the longitudinal axis 44 between the top side 46 and the bottom side 48 of the beam 22 and adjacent to the first end 40 of the beam 22. In other words, the first axis 66 extends through the front and rear sides 50, 52 of the beam 22 perpendicular to the longitudinal axis 44. The first cam lock 58 is mounted directly to the surface of the top side 46 of the beam 22 and is configured to operably engage the pivotable first locking arm 56 as the towing dolly assembly 20 moves between the retracted configuration (as shown in FIGS. 1 and 3) and the extended configuration (as shown in FIGS. 2 and 4). The first axle 60 is connected to the first locking arm 56 and is configured to rotatably receive the first wheel hub 62.

Likewise, the second spindle assembly 26 is arranged on the beam 22 proximal to the second end 42 of the beam 22. Referring still to FIG. 5, the second spindle assembly 26 includes a second locking arm 70, a second cam lock 72, a second axle 74, a second wheel hub 76, and a second fastener 78. The second locking arm 70 is pivotable about a second axis 80 that extends perpendicular to the longitudinal axis 44 between the top and bottom sides 46, 48 of the beam 22 and adjacent to the second end 42 of the beam 22. In other words, the second axis 80 extends through the front and rear sides 50, 52 of the beam 22 perpendicular to the longitudinal axis 44. The second cam lock 72 is mounted directly to the surface of the top side 46 of the beam 22 and is configured to operably engage the pivotable second locking arm 70 as the towing dolly assembly 20 moves between the retracted configuration (as shown in FIGS. 1 and 3) and the extended configuration (as shown in FIGS. 2 and 4). The second axle 74 is connected to the second locking arm 70 and is configured to rotatably receive the second wheel hub 76.

Figure 6:
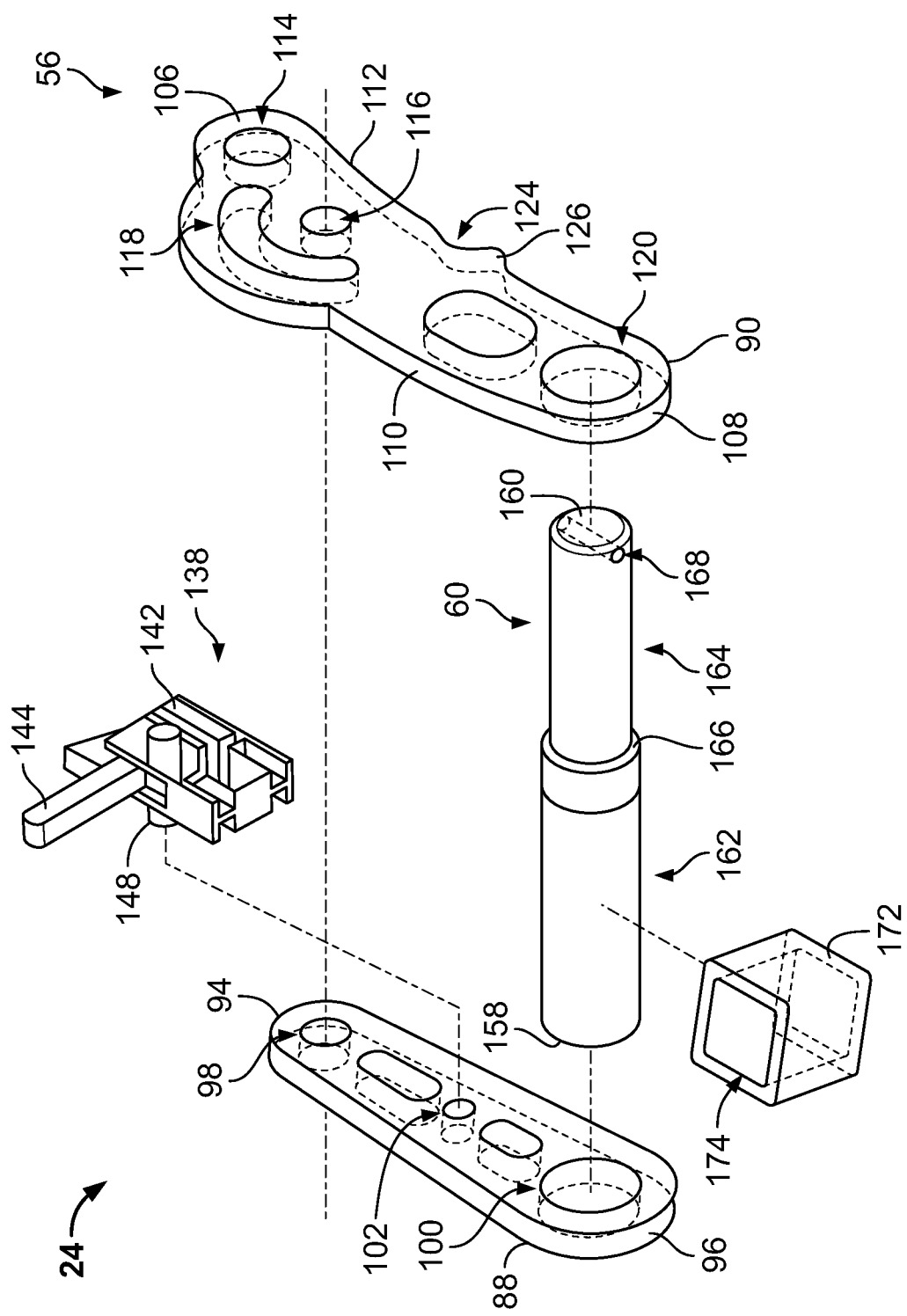
FIG. 6 is a perspective exploded view of a first spindle assembly of the towing dolly assembly of FIG. 1.

Referring now to FIG. 6, some components the first spindle assembly 24 are illustrated in an exploded configuration. For ease of reference, only some components of the first spindle assembly 24 are illustrated. The second spindle assembly 26 includes generally the same components as the first spindle assembly 24 except that the second spindle assembly 26 arranged on the second end 42 of the beam 22 mirrors the first spindle assembly 24 arranged on the first end 40 of the beam 22. The first locking arm 56 of the first spindle assembly 24 includes a first locking plate 88 and a second locking plate 90. The first locking plate 88 has a first end 94 and a second end 96 opposite the first end 94. A first or pivot hole 98 extends through the first locking plate 88 and is arranged adjacent to the first end 94. A second or axle hole 100 extends through the first locking plate 88 and is arranged adjacent to the second end 96. A third or ratcheting hole 102 extends through the first locking plate 88 and is arranged between the pivot and axle holes 98, 100.

Figure 9:
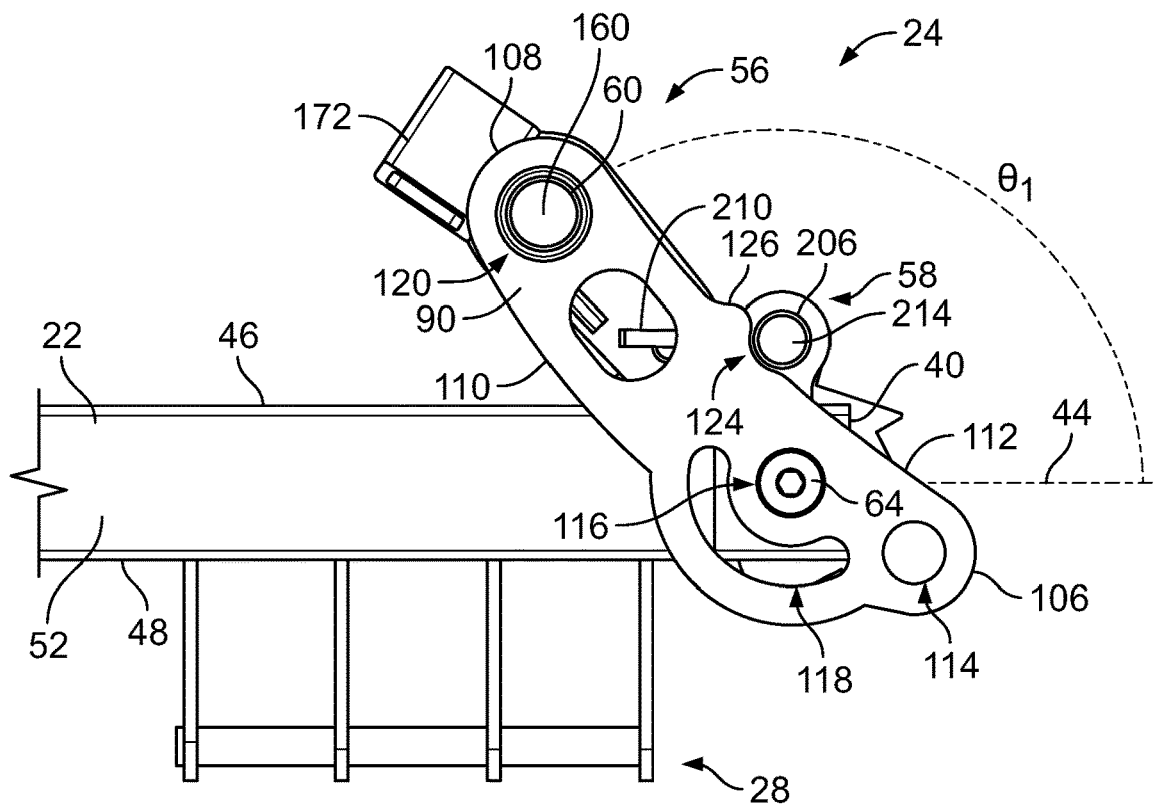
FIG. 9 is a rear detail view of a first spindle assembly of the towing dolly assembly of FIG. 1 in a retracted configuration.

With continued reference to FIG. 6, the second locking plate 90 has a first end 106, a second end 108 opposite the first end 106, a first outer side 110, and a second outer side 112 opposite the first outer side 110. A first or lock pin hole 114 extends through the second locking plate 90 and is arranged adjacent to the first end 106. A second or pivot hole 116 extends through the second locking plate 90 and is arranged between the lock pin hole 114 and the second end 108. A third or lock pin guide opening 118 extends through the second locking plate 90 and is arranged adjacent to both the first outer side 110 and the pivot hole 116 between the lock pin hole 114 and the second end 108. In the illustrated embodiment, the lock pin guide opening 118 is a curved slot having a radius with a center point being aligned with the fastener hole 116. In other words, the radius of the lock pin guide opening 118 is centered on the fastener hole 116. As such, the first outer side 110 includes a rounded portion to accommodate the lock pin guide opening 118 while minimizing the outer profile of the second locking plate 90. As discussed in greater detail below, the lock pin guide opening 118 is configured to align with the first cam lock 58 as the first locking arm 56 pivots about the first axis 66 for at least a range of angles. A fourth or axle hole 120 extends through the second locking plate 90 and is arranged adjacent to the second end 108. A lock pin holding recess 124 and a lock pin holding protrusion 126 are arranged on the second outer side 112 of the second locking plate 90. As discussed in greater detail below with reference to FIG. 9, the lock pin holding recess and protrusion 124, 126 are configured to releasably engage the first cam lock 58 while the towing dolly assembly 20 is in the retracted configuration (as shown in FIGS. 1, 3, and 9).

Referring again to FIG. 5, the first and second spindle assemblies 24, 26 are pivotably attached to the beam 22 via the first and second fasteners 64, 78, respectively. Thus, the beam 22 includes a first fastener hole 128 arranged toward the first end 40 and aligned with the first axis 66, and a second fastener hole 130 arranged toward the second end 42 and aligned with the second axis 80. In the illustrated embodiment, the first and second fastener holes 128, 130 of the beam 22 extend through the front and rear sides 50, 52 of the beam 22 and through the longitudinal axis 44. In some embodiments, the first and second fastener holes 128, 130 of the beam 22 (and, thus, the first and second axes 66, 80) can extend perpendicular to the longitudinal axis 44 but toward the top side 46 or toward the bottom side 48 of the beam 22.

For ease of reference, the structure providing the pivotable attachment of the first spindle assembly 24 is described below. In the illustrated embodiment, the second spindle assembly 26 is attached to the beam 22 via the second fastener hole 130 and the second fastener 78 in a similar manner as the first spindle assembly 24. In regard to the first spindle assembly 24, with the first locking plate 88 arranged on the front side 50 of the beam 22 and the second locking plate 90 arranged on the rear side 52 of the beam 22, the first fastener 64 is received within the pivot hole 98 of the first locking plate 88, the first fastener hole 128 of the beam 22, and the pivot hole 116 of the second locking plate 90. Thus, each of the pivot hole 98 of the first locking plate 88, the first fastener hole 128 of the beam 22, and the pivot hole 116 of the second locking plate 90 are aligned with the first axis 66. In the illustrated embodiment, the first fastener 64 secures the first locking arm 56 to the beam 22 via a fastener nut 132 and a fastener washer 134 threadably attached to a threaded end of the first fastener 64. In some embodiments, the first fastener 64 can be an alloy steel shoulder screw, the fastener nut 132 can be a high-strength steel nylon-insert locknut, and the fastener washer 134 can be carbon steel ring shim. In some embodiments, the first fastener 64 can be configured to secure the first locking arm 56 to the beam 22 using other known fastening arrangements, such as, for example, a snap ring.

With continued reference to FIGS. 5 and 6, the first spindle assembly 24 further includes a first ratcheting assembly 138 that is configured to releasably hold the first locking arm 56 at various angles about the first axis 66 as the towing dolly assembly 20 moves between the retracted configuration (as shown in FIGS. 1 and 3) and the extended configuration (as shown in FIGS. 2 and 4). In the illustrated embodiment, the first ratcheting assembly 138 includes a ratchet gear 140 having a plurality of teeth and a ratchet case 142 having a ratchet pawl 144. The ratchet gear 140 is arranged between the front side 50 of the beam 22 and an inner side of the first locking plate 88 and includes a through hole 146 that is configured to align with the first axis 66 and receive the first fastener 64. The ratchet case 142 is arranged on the inner side of the first locking plate 88 and includes a dowel 148 that is configured to be fixedly received by the ratcheting hole 102 of the first locking plate 88. The ratchet case 142 includes a spring-biased engaging member (not shown) that is configured to releasably engage one of the plurality of teeth of the ratchet gear 140 and is moveable between an engaged position and a retracted position by the ratchet pawl 144.

The first spindle assembly 24 can further include a first extension plate 152 having a through hole 154 that is arranged between the rear side 52 of the beam 22 and an inner side of the second locking plate 90. The first extension plate 152 is arranged such that the through hole 154 aligns with the first axis 66 and receives the first fastener 64. As discussed in greater detail below, the first extension plate 152 can provide increased spacing between the second locking plate 90 of the first locking arm 56 and the first cam lock 58 of the first spindle assembly 24 to prevent interference while the first locking arm 56 pivots about the first axis 66. In some embodiments, the first extension plate 152 can be mounted directly to a surface of the rear side 52 of the beam 22.

Referring again to FIG. 6, the first axle 60 of the first spindle assembly 24 has a first end 158, a second end 160 opposite the first end 158, a first portion 162 arranged toward the first end 158 and having a first diameter, a second portion 164 arranged toward the second end 160 and having a second diameter that is less than the first diameter, and a flange 166 located between the first and second portions 162, 164. The first portion 162 of the first axle 60 is fixedly received within the axle hole 100 of the first locking plate 88 and the second portion 164 of the first axle 60 is received within the axle hole 120 of the second locking plate 90 such that the flange 166 contacts the inner surface of the second locking plate 90. The second end 160 of the first axle 60 is configured to rotatably receive the first wheel hub 62 of the first spindle assembly 24, such as, for example, via a fastener received within a through hole 168 extending through the second portion 164 near the second end 160 of the first axle 60.

With continued reference to FIG. 6, the first spindle assembly 24 further includes a first pry bar receiver 172 arranged on an outer surface of the first portion 162 of the first axle 60 between the first and second locking plates 88, 90. The first pry bar receiver 172 includes an opening 174 that is configured to receive a pry bar (not shown). With the pry bar (not shown) received within the opening 174 of the first pry bar receiver 172, the pry bar can be used to rotate the first locking arm 56 of the first spindle assembly 24 when the towing dolly assembly 20 is installed on an automobile to be towed and is moved from the retracted position to the extended configuration, or a plurality of configurations having different angles that are releasably held in position by the first ratcheting assembly 138.

Referring now to FIGS. 7 and 8, the first cam lock 58 is shown in greater detail. For ease of reference, only the first cam lock 58 is shown in detail. In the illustrated embodiment, the second cam lock 72 of the second spindle assembly 26 includes generally the same components arranged in a similar manner as the first cam lock 58 of the first spindle assembly 24, but the second cam lock 72 is mirrored about the central plane of the beam 22.

Figure 10:
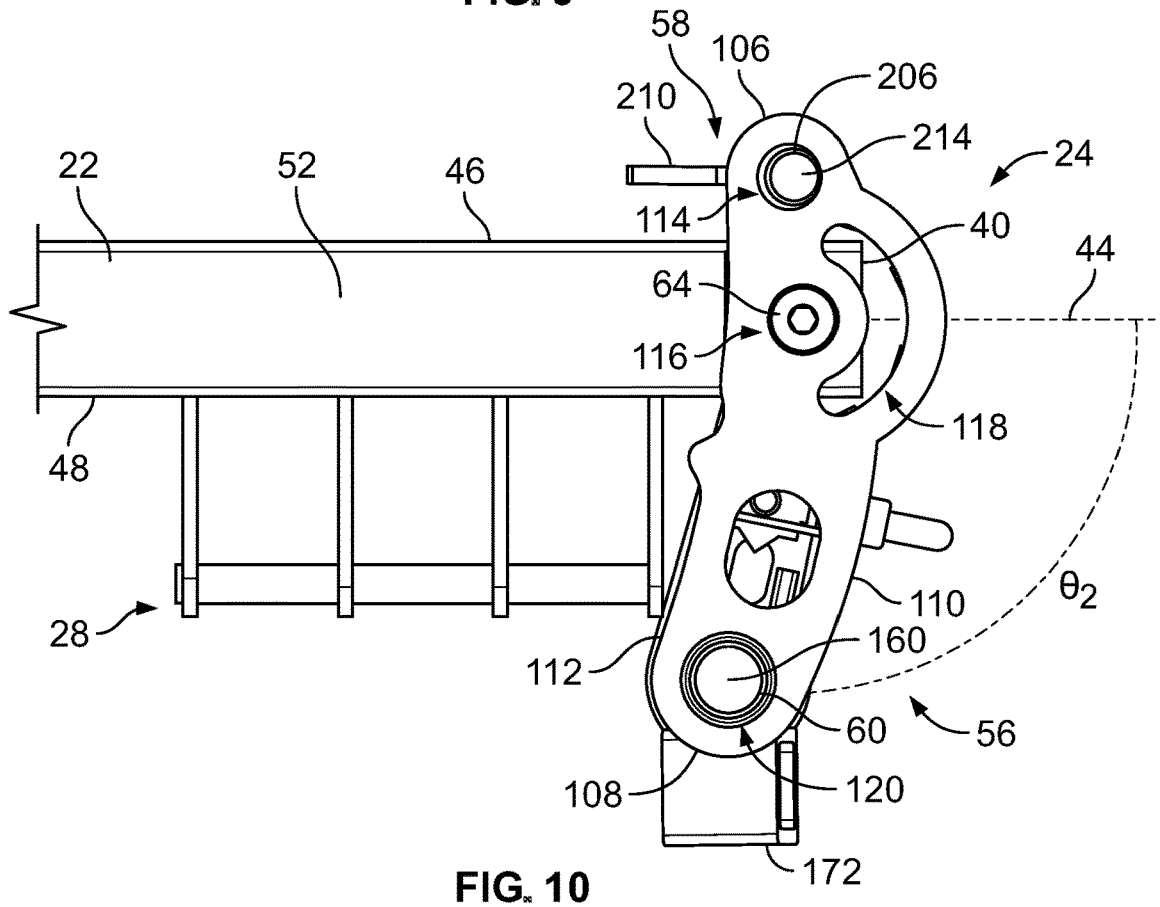
FIG. 10 is a rear detail view of a first spindle assembly of the towing dolly assembly of FIG. 1 in an extended configuration.

Referring specifically to FIG. 7, the first cam lock 58 is illustrated in an exploded view. The first cam lock 58 includes a lock case 204, a lock pin 206, a spring 208, and a lever 210. The first cam lock 58 is configured such that lock pin 206 is moveable between a retracted position (as shown in FIG. 8) and an extended position (as shown in FIGS. 9 and 10). The lock pin 206 has a first end 214, a second end 216 opposite the first end 214, a head 218 at the first end 214, a shaft 220 extending from the second end 216 to the head 218, and a lever hole 222 extending radially through the shaft 220 near the second end 216. The lever hole 222 of the lock pin 206 is configured to fixedly receive an end of the lever 210. The lock case 204 has a first end 226, a second end 228 opposite the first end 226, a first side 230, a second side 232 opposite the first side 230, a base 234, and a lock pin housing 236 extending from the base 234. In the illustrated embodiment, the lock case 204 is a monolithically formed single piece. In some embodiments, the lock case 204 can include two or more separately formed components, such as, for example, the base 234 can be formed separately and later joined with the lock pin housing 236.

Referring to FIGS. 7 and 8, the lock pin housing 236 includes a counterbore hole 240 having a first portion 242 with a first diameter, a second portion 244 having a second diameter that is less than the first diameter of the first portion 242, and a shoulder 246 formed at the first and second portions 242, 244. The counterbore hole 240 is configured to receive the spring 208 and the lock pin 206 such that the spring 208 is disposed about the shaft 220 of the lock pin 206 between the shoulder 246 of the counterbore hole 240 and the head 218 of the lock pin 206. Thus, the lock pin 206 is moveable axially within the counterbore hole 240 while being biased toward the first end 226 of the lock case 204 by the spring 208.

Referring to FIG. 8, the second end 228 of the lock pin housing 236 has a first surface 248 extending perpendicular to the counterbore hole 240 on the first side 230 and parallel to the first end 226 of the lock case 204, a second surface 250 extending at an angle from the first surface 248 to the second side 232 at an angle toward the second end 228 of the lock case 204, and a third surface 252 extending downwardly from the second surface 250 on the second side 232 and perpendicular to the counterbore hole 240. Thus, the first surface 248 is at a first distance from the first end 226 of the lock case 204, and the third surface 252 is at a second distance from the first end 226 of the lock case 204 that is greater than the first distance of the first surface 248. With the lock pin 206 and the spring 208 disposed within the counterbore hole 240 of the lock pin housing 236, the second end 216 of the lock pin 206 extends past at least the first surface 248 of the second end 228 of the lock pin housing 236 such that the lever 210 can be received within the lever hole 222 of the lock pin 206. With the lever 210 coupled to the lock pin 206, the lever 210 contacts either the first, second, or third surfaces 248, 250, 252 at the second end 228 of the lock pin housing 236 depending on an angle in which the lock pin 206 is rotated within the lock pin housing 236.

When the lever contacts the first surface 248, the lock pin 206 is at a first angle and is biased by the spring 208 toward the first end 226 of the lock pin housing 236 such that head 218 of the lock pin 206 moves away from the shoulder 246 of counterbore hole 240 and the first end 214 of the lock pin 206 extends outwardly from the first end 226 of the lock pin housing 236 (i.e., the extended position). As the lever 210 is rotated from the first surface 248 to the third surface 252 along the angled second surface 250, the lock pin 206 is rotated from the first angle and pulled axially toward the second end 228 of the lock pin housing 236 such that the head 218 of the lock pin 206 compresses the spring 208 against the shoulder 246. Once the lever 210 contacts the third surface 252, the lock pin 206 is rotated at a second angle such that the first end 214 of the lock pin 206 is aligned with the first end 226 of the lock pin housing 236 (i.e., the retracted position). Therefore, the first, second, and third surfaces 248, 250, 252 of the second end 228 of the lock pin housing 236 are configured to form a cam lock that engage the lever 210 to cause the lock pin 206 to move axially within the counterbore hole 240 and the first end 214 of the lock pin 206 to extend from or retract to the first end 226 of the lock case 204.

As briefly mentioned above, the first cam lock 58 of the first spindle assembly 24 is mounted directly to the top side 46 of the beam 22. Thus, in the illustrated embodiment, a bottom surface of the base 234 of the lock case 204 contacts the surface of the top side 46 of the beam 22. The first cam lock 58 is arranged on the top side 46 of the beam 22 with the counterbore hole 240 of the lock case 204 extending perpendicular to the longitudinal axis 44 of the beam 22 and parallel to the first axis 66 of the beam 22, such that the first end 226 of the lock case 204 faces the rear side 52 of the beam 22.

FIGS. 9 and 10 illustrate the first locking arm 56 of the first spindle assembly 24 in greater detail when the towing dolly assembly 20 is in the retracted configuration (as shown in FIGS. 1, 3, and 6) and is in the extended configuration (as shown in FIGS. 2, 4, and 7). For illustrative purposes, the first wheel hub 62 and the first wheel assembly 32 are not shown in FIGS. 6 and 7. Further, for ease of reference, only the first spindle assembly 24 is shown in detail. As mentioned above, the second spindle assembly 26 has generally similar components arranged in a similar manner as the first spindle assembly but mirrored about the center of the beam 22.

Referring specifically to FIG. 9, with the towing dolly assembly 20 in the retracted configuration, the first locking arm 56 of the first spindle assembly 24 is in a first position such that the first axle 60 is at a first angle $\ominus_1$ relative to the longitudinal axis 44 of the beam 22. With the first locking arm 56 at the first angle $\ominus_1$, the lock pin 206 of the first cam lock 58 is biased to the extended configuration and is received within the lock pin holding recess 124 of the second locking plate 90. As such, the head 218 (see FIGS. 7 and 8) the first end 214 of the lock pin 206 contacts the lock pin holding protrusion 126 and holds the first locking arm 56 in position until the lever 210 of the first cam lock 58 is rotated. In some embodiments, the first angle $\ominus_1$ of the first axle 60 relative to the longitudinal axis 44 of the beam 22 is in a range of about 15 degrees to about 175 degrees, in a range of about 30 degrees to about 160 degrees, in a range of about 45 degrees to about 145 degrees, or in a range of about 115 degrees to about 170 degrees.

As the lever 210 of the first cam lock 58 is rotated, the lock pin 206 moves to the retracted position and the head 218 (see FIGS. 7 and 8) at the first end 214 of the lock pin 206 disengages the lock pin holding recess 124 of the second locking plate 90 causing the first locking arm 56 to be freely rotatable. To move the towing dolly assembly 20 to the extended configuration from the retracted configuration, the first and second locking arms 56, 70 are rotated downwardly toward the first and second axle cradle assemblies 28, 30. As the first locking arm 56 is rotated about the first axis 66 toward the first axle cradle assembly 28, the first end 214 of the lock pin 206 biased in an intermediary position (i.e., between the retracted position and the extended position) contacts an inner surface of the second locking plate 90 and engages the lock pin guide opening 118 of the second locking plate 90.

Referring specifically to FIG. 10, as the first locking arm 56 is rotated further downwardly the lock pin hole 114 of the second locking plate 90 is aligned with the first end 214 of the lock pin 206 permitting the head 218 of the lock pin 206 to extend outwardly from the lock case 204 and engage the sides of the lock pin hole 114 of the second locking plate 90 (as shown in FIG. 10). With the head 218 of the lock pin 206 received within the lock pin hole 114 of the second locking plate 90, the extended lock pin 206 prevents the first locking arm 56 from rotating as the towing dolly assembly 20 is in the extended configuration (with the second locking arm 70 of the second spindle assembly 26 also in the second position). With the towing dolly assembly 20 in the extended configuration, the first locking arm 56 of the first spindle assembly 24 is in a second position (as shown in FIG. 10) such that the first axle 60 is at a second angle $\ominus_2$ relative to the longitudinal axis 44 of the beam 22.

In the illustrated embodiment, the second angle $\ominus_2$ of the first axle 60 relative to the longitudinal axis 44 of the beam 22 is about −90 degrees. In some embodiments, the second angle $\ominus_2$ of the first axle 60 relative to the longitudinal axis 44 of the beam 22 is in a range of about −15 degrees to about −100 degrees, in a range of about −30 degrees to about −95 degrees, in a range of about −45 degrees to about −90 degrees, or in a range of about −80 degrees to about −90 degrees.

As briefly mentioned above, the second spindle assembly 26 includes generally similar components arranged in a similar manner as the first spindle assembly 24 and is attached to the beam 22 via the second fastener hole 130 and the second fastener 78 similar to the first spindle assembly 24 being attached to the beam 22 via the first fastener hole 128 and the first fastener 64, as described above with reference to FIG. 9. For example, and referring again to FIG. 5, the second locking arm 70 of the second spindle assembly 26 includes a first locking plate 180 and a second locking plate 182 that are similar to the first and second locking plates 88, 90 of the first spindle assembly 24 but mirrored about a central plane of the beam 22. Further, the second spindle assembly 26 includes the second axle 74 that is identical to the first axle 60 of the first spindle assembly 24. Still further, the second spindle assembly 26 includes a second ratcheting assembly 186 that includes a ratchet gear 188 having a plurality of teeth and a ratchet case 190 having a ratchet pawl 192 that are similar to the first ratcheting assembly 138 of the first spindle assembly 24. Moreover, the second spindle assembly 26 can include a second extension plate 196 and a second pry bar receiver 198 similar to the first extension plate 152 and the first pry bar receiver 172 of the first spindle assembly 24. In other words, the first and second spindle assemblies 24, 26 include generally the components such that the first and second spindle assemblies 24, 26 are identical but mirrored relative to the central plane of the beam 22.

Referring again to FIGS. 1 and 2, the second spindle assembly 26 is configured to pivot about the second axis 80 and be engaged by the second cam lock 72 similar to the first spindle assembly 24 pivoting about the first axis 66 being engaged by the first cam lock 58 as the towing dolly assembly 20 moves between the retracted configuration (as shown in FIG. 1) and the extended configuration (as shown in FIG. 2), as described above with reference to FIGS. 9 and 10. As such, the second cam lock 72 includes similar components arranged in a similar manner as the first cam lock 58, as described with reference to FIGS. 7 and 8. Further, similar to the first cam lock 58 of the first spindle assembly 24, the second cam lock 72 is mounted directly to the top side 46 of the beam 22, and is arranged relative to the longitudinal axis 44 of the beam 22, but parallel to the second axis 80.

Figure 11:
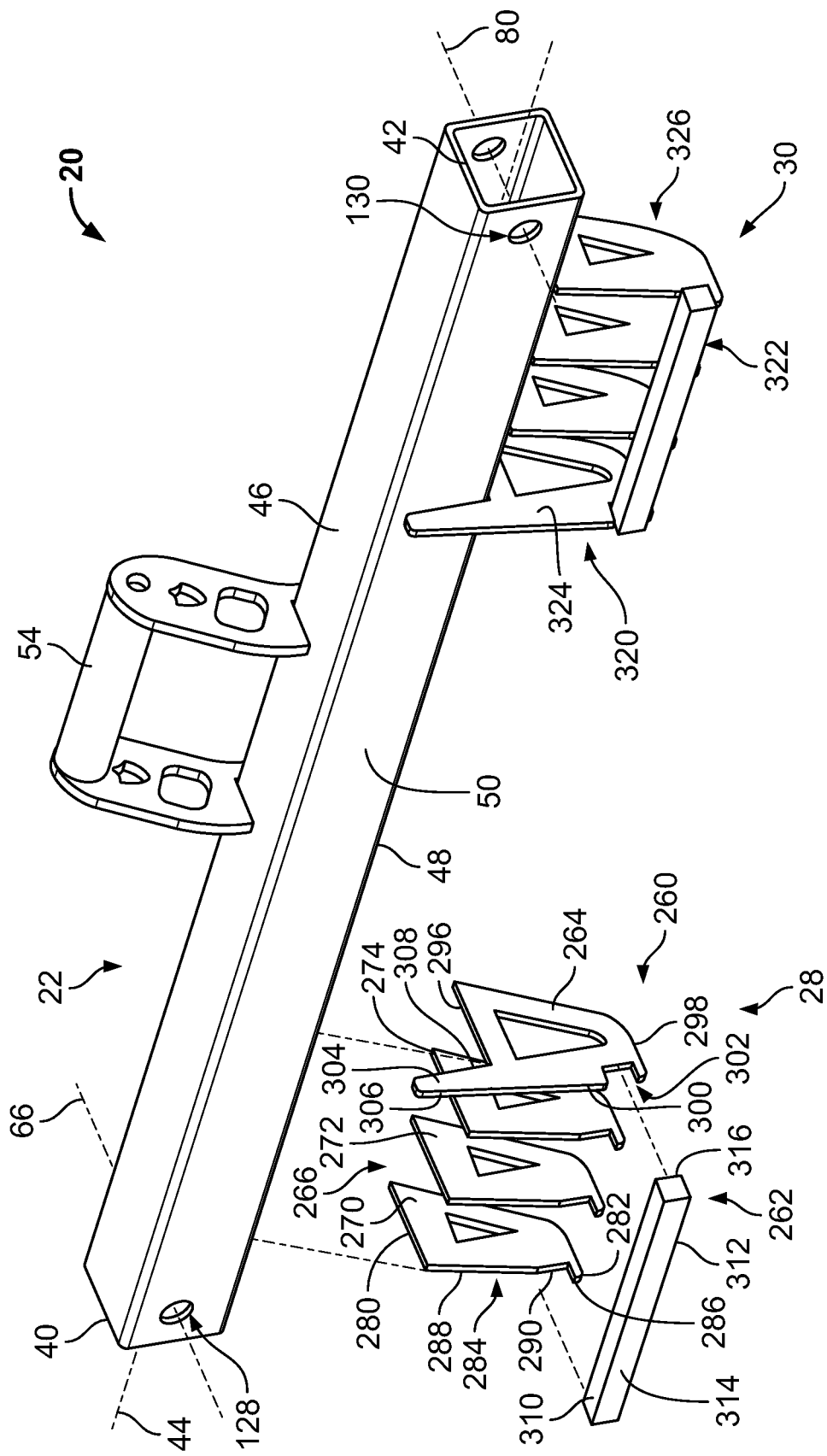
FIG. 11 is a perspective partial exploded view of a first axle cradle assembly of the towing dolly assembly of FIG. 1 with first and second spindle assemblies and first and second wheel assemblies removed.

Referring now to FIG. 11, the first axle cradle assembly 28 of the towing dolly assembly 20 is shown in an exploded configuration. For ease of reference, only the first axle cradle assembly 28 is shown in the exploded configuration. As shown in FIG. 11, in the illustrated embodiment, the second axle cradle assembly 30 includes generally similar components arranged in a similar manner as the first axle cradle assembly 28 but being mirrored about the central plane of the beam 22. The first axle cradle assembly 28 includes a plurality of mounting plates 260 fixedly attached to the bottom side 48 of the beam 22 and a first crossbar 262 attached to each of the plurality of mounting plates 260.

In the illustrated embodiment, the plurality of mounting plates 260 includes a first or inner mounting plate 264 arranged toward the central plane of the beam 22 and a plurality of second or outer mounting plates 266 arranged toward the first end 40 of the beam 22. In the illustrated embodiment, the plurality of outer mounting plates 266 includes a first outer mounting plate 270 arranged toward the first end 40 of the beam 22, a second outer mounting plate 272 arranged between the first outer mounting plate 270 and the inner mounting plate 264, and a third outer mounting plate 274 arranged between the second outer mounting plate 272 and the inner mounting plate 264. The plurality of mounting plates 260 is arranged such that each of the mounting plates 260 are at uniform distance from an adjacent mounting plate 260.

Referring still to FIG. 11, each of the plurality of outer mounting plates 266 have a first or upper end 280, a second or lower end 282 opposite the upper end 280, a first or front side 284 facing away from the front side 50 of the beam 22, and a crossbar protrusion 286 extending from the lower end 282 toward the front side 284. The upper ends 280 of the plurality of outer mounting plates 266 are fixedly attached to the bottom side 48 of the beam 22. The front sides 284 of the plurality of outer mounting plates 266 include a first surface 288 extending downwardly from the upper end 280 at a first angle relative to the upper end 280 toward the lower end 282 and a second surface 290 extending from the first surface 288 to the crossbar protrusion 286. In the illustrated embodiment, the second angle of the second surface 290 of the front side 284 is substantially parallel to the front side 50 of the beam 22.

The inner mounting plate 264 has a first or upper end 296, a second or lower end 298 opposite the upper end 296, a first or front side 300 facing away from the front side 50 of the beam 22, a crossbar channel 302 extending through the front side 300 toward the lower end 298, and a support leg 304 upwardly from the upper end 296 on the front side 300. Similar to the plurality of outer mounting plates 266, the upper end 296 of the inner mounting plate 264 is fixedly attached to the bottom side 48 of the beam 22. The front side 300 extends at a third angle relative to the upper end 296 that is different than both the first and second angles of the first and second surfaces 288, 290, respectively, of the front sides 284 of the plurality of outer mounting plates 266. The support leg 304 has an outer surface 306 that aligns with the front side 300 and an inner surface 308 that extends parallel to the front side 50 of the beam 22 such that the inner surface 308 of the support leg 304 contacts the front side 50 of the beam 22 while the upper end 296 contacts the bottom side 48 of the beam 22. The support leg 304 of the inner mounting plate 264 may be configured to increase the distribution of a load applied on the first axle cradle assembly 28 to the beam 22.

With continued reference to FIG. 11, the first crossbar 262 has a first or top side 310, a second or bottom side 312 opposite the top side 310, a third or front side 314 adjacent to both the top and bottom sides 310, 312, and a fourth or rear side 316 opposite the front side 314. The first crossbar 262 is configured to be fixedly received within the crossbar channel 302 of the inner mounting plate 264 and to be fixedly attached to each of the second surfaces 290 of the front sides 284 and the crossbar protrusions 286 of the plurality of outer mounting plates 266. Thus, the top, bottom, and rear sides 310, 312, 316 of the first crossbar 262 contact the crossbar channel 302 of the inner mounting plate 264 while the bottom and rear sides 312, 316 contact the crossbar protrusions 286 and the second surfaces 290 of the front sides 284, respectively, of the plurality of outer mounting plates 266. In some embodiments, a gap between the crossbar channel 302 of the inner mounting plate 264 and the top side 310 of the first crossbar 262 is welded such that the top side 310 of the first crossbar 262 contacts the crossbar channel 302.

Referring to FIGS. 3 and 11, the first axle cradle assembly 28 is configured such that the first surfaces 288 of the front sides 284 of the plurality of outer mounting plates 266 do not contact the top side 310 of the first crossbar 262 and extend at the first angle outwardly from the top side 310 of the first crossbar 262. As discussed in greater detail below, this configuration can be beneficial in particular applications because the plurality of outer mounting plates 266 do not impede movement of a mating component of an axle rod tube (not shown) that attaches to the first crossbar 262 across the top side 310 to the rear side 316 of the first crossbar 262 when the towing dolly assembly 20 is in the retracted configuration and being installed on an automobile to be towed.

In some embodiments, the first axle cradle assembly 28 can include only the plurality of outer mounting plates 266 and the first crossbar 262. In some embodiments, the first outer mounting plate 270 of the first axle cradle assembly 28 can be configured similar to the inner mounting plate 264, such as, for example, including a support leg and/or a crossbar channel. In some embodiments, the plurality of outer mounting plates 266 can include only first and second outer mounting plates 270, 272 or can include four or more outer mounting plates. In some embodiments, the plurality of outer mounting plates 266 may be comprised of a first material and the inner mounting plate 264 may be comprised of a second material having different properties than the first material.

Referring again to FIG. 11, the second axle cradle assembly 30 is shown assembled. In the illustrated embodiment, the second axle cradle assembly 30 includes the same components arranged in a similar manner as the first axle cradle assembly 28 but mirrored about the central plane of the beam 22. Thus, the second axle cradle assembly 28 includes a plurality of mounting plates 320 and a second crossbar 322. In the illustrated embodiment, the plurality of mounting plates 320 of the second cradle assembly 30 includes an inner mounting plate 324 arranged toward the center of the beam 22 and a plurality of outer mounting plates 326 arranged toward the second end 42 of the beam 22 adjacent to the inner mounting plate 324. The second crossbar 322 is fixedly attached to the inner mounting plate 324 and the plurality of outer mounting plates 326 in a similar manner as the first crossbar 262 is fixedly attached to the plurality of mounting plates 260 in the first axle cradle assembly 28.

In some embodiments, the plurality of mounting plates 260 of the first axle cradle assembly 28 includes a number of mounting plates that is greater than or less than the plurality of mounting plates 320 of the second cradle assembly 30. In some embodiments, the plurality of mounting plates 260 of the first axle cradle assembly 28 may be comprised of a first material and the plurality of mounting plates 320 of the second cradle assembly 30 may be comprised of a second material that has different properties that the first material. In some embodiments, the plurality of mounting plates 260 of the first axle cradle assembly 28 can be evenly spaced apart at a first distance and the plurality of mounting plates 320 of the second cradle assembly 30 can be evenly spaced apart at a second distance that is greater than or less than the first distance.

As briefly mentioned above, the towing dolly assembly 20 can be included as part of a towing dolly cradle assembly that is configured to cradle at least one axle having two wheels of an automobile to be towed. For example, referring to FIG. 12, an exemplary towing dolly cradle assembly 400 can include a first towing dolly assembly 402, such as the towing dolly assembly 20 as described with reference to FIGS. 1-11, a second towing dolly assembly 404 that is similar to the first towing dolly assembly 402, a first axle cradle tube 406, and a second axle cradle tube 408. The first and second towing dolly assemblies 402, 404 can be arranged about an automobile (not shown) such that longitudinal axes 416, 418 of beams 420, 422 of the first and second towing dolly assemblies 402, 404, respectively, are substantially parallel to each other. More specifically, the first towing dolly assembly 402 can be arranged on a first longitudinal side of the automobile (not shown) with a first or front side 424 of the beam 420 of the first towing dolly assembly 402 arranged adjacent to an outer side 426 of a first wheel 430 of a first axle 432 of the automobile. Similarly, the second towing dolly assembly 404 can be arranged on a second longitudinal side of the automobile (not shown), opposite the first longitudinal side, with a first or front side 434 of the beam 422 of the second towing dolly assembly 404 arranged adjacent to an outer side 436 of a second wheel 438 of the first axle 432 of the automobile.

The first and second axle cradle tubes 406, 408 can be arranged between the first and second towing dolly assemblies 402, 404 and along the first axle 432 of the automobile such that longitudinal axes 440, 442 of the first and second axle cradle tubes 406, 408, respectively, are substantially perpendicular to the longitudinal axes 416, 418 of the beams 420, 422 of the first and second towing dolly assemblies 402, 404. More specifically, the first axle cradle tube 406 is arranged adjacent to a ground surface G and both a first circumferential side 444 of the first wheel 430 and a first circumferential side 446 of the second wheel 438 of the first axle 432 of the automobile. Similarly, the second axle cradle tube 408 is arranged adjacent to the ground surface G and both a second circumferential side 448 of the first wheel 430 and a second circumferential side 450 of the second wheel 438 of the first axle 432 of the automobile.

The first and second axle cradle tubes 406, 408 include first engaging members 454, 456 arranged at first ends 458, 460 and second engaging members 462, 464 arranged at second ends 466, 468, opposite the first ends 458, 460, respectively. The first engaging member 454 of the first axle cradle tube 406 is configured to releasably engage a first axle cradle assembly 472 of the first towing dolly assembly 402 and the second engaging member 462 is configured to releasably engage a second axle cradle assembly 474 of the second towing dolly assembly 404. Similarly, the first engaging member 456 of the second axle cradle tube 408 is configured to releasably engage a second axle cradle assembly 476 of the first towing dolly assembly 402 and the second engaging member 464 is configured to releasably engage a first axle cradle assembly 478 of the second towing dolly assembly 404. Further, in the illustrated embodiment, the first axle cradle tube 406 includes first and second wheel plates 480, 482 arranged toward the first and second ends 458, 466, respectively, that are configured to engage the first circumferential sides 444, 446 of the first and second wheels 430, 438, respectively. Likewise, the second axle cradle tube 408 includes first and second wheel plates 484, 486 arranged toward the first and second ends 460, 468, respectively, that are configured to engage the second circumferential sides 448, 450 of the first and second wheels 430, 438, respectively.

Figure 12:
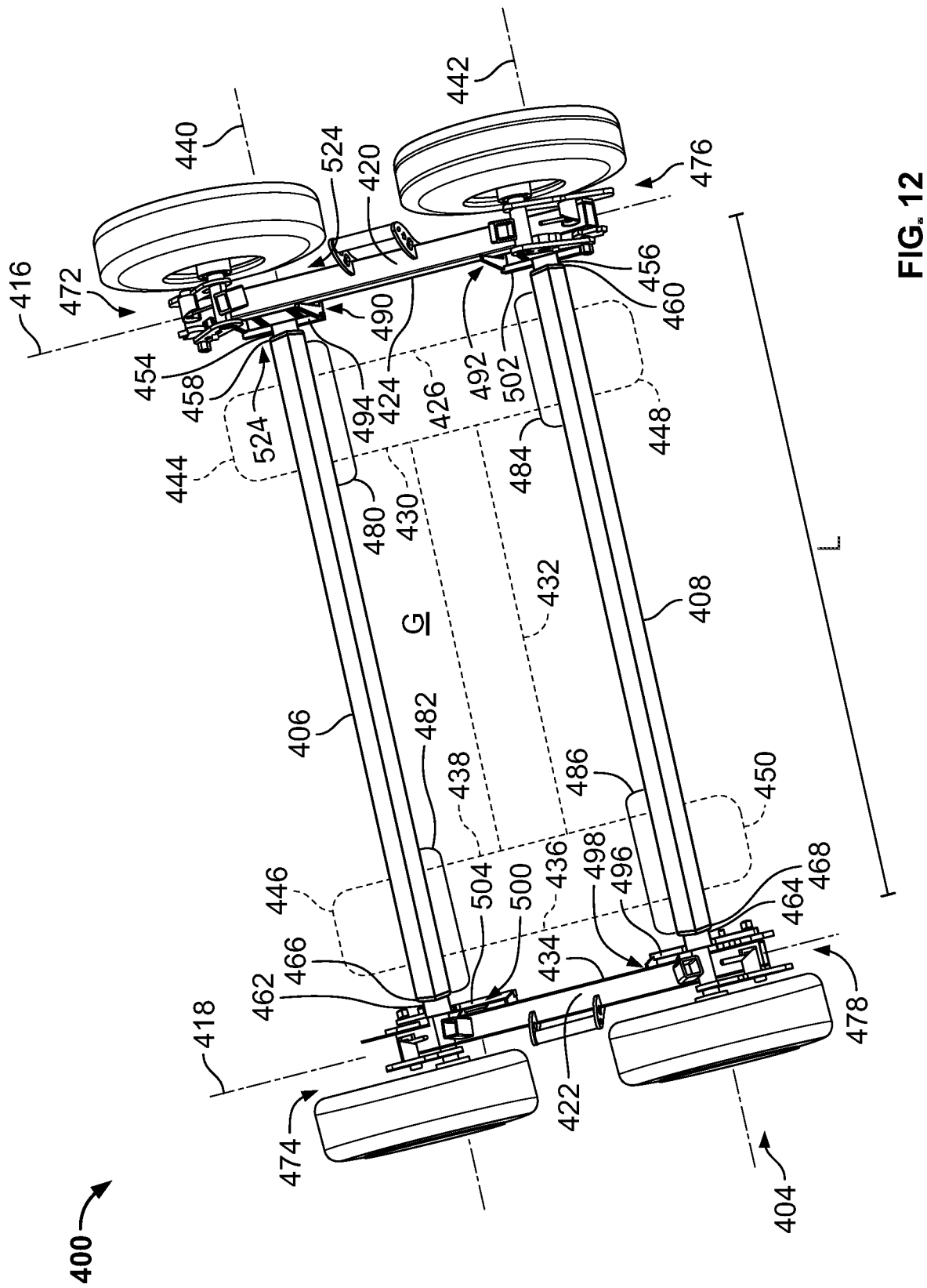
FIG. 12 an isometric view of a towing dolly cradle assembly on an axle of an automobile shown in broken lines that is consistent with at least some aspects of the present disclosure.

With each of the first and second towing dolly assemblies 402, 404 in a retracted configuration (as shown in FIG. 12), the first and second axle cradle tubes 406, 408 are releasably attached to the respective first and second axle cradle assemblies 472, 474, 476, 478 of the first and second towing dolly assemblies 402, 404. More specifically, the first axle cradle assemblies 472, 478 of the first and second towing dolly assemblies 402, 404 each include a plurality of mounting plates 490, 492 and a first crossbar 494, 496. In the illustrated embodiment, the plurality of mounting plates 490, 492 and the first crossbars 494, 496 of the first axle cradle assemblies 472, 478 of the first and second towing dolly assemblies 402, 404 of the towing dolly cradle assembly 400, respectively, are arranged similarly to the plurality of mounting plate 260 and the first crossbar 262 of the first axle cradle assembly 28 of the towing dolly assembly 20 as described with reference to FIG. 11. Likewise, the second axle cradle assemblies 474, 476 of the first and second towing dolly assemblies 402, 404 each include a plurality of mounting plates 498, 500 and a second crossbar 502, 504, respectively. In the illustrated embodiment, the plurality of mounting plates 498, 500 and the second crossbars 502, 504 of the second axle cradle assemblies 474, 476 of the first and second towing dolly assemblies 402, 404, respectively, are arranged similarly to the plurality of mounting plates 320 and the second crossbar 322 of the second axle cradle assembly 30 of the towing dolly assembly 20 as described with reference to FIG. 11.

Figure 13:
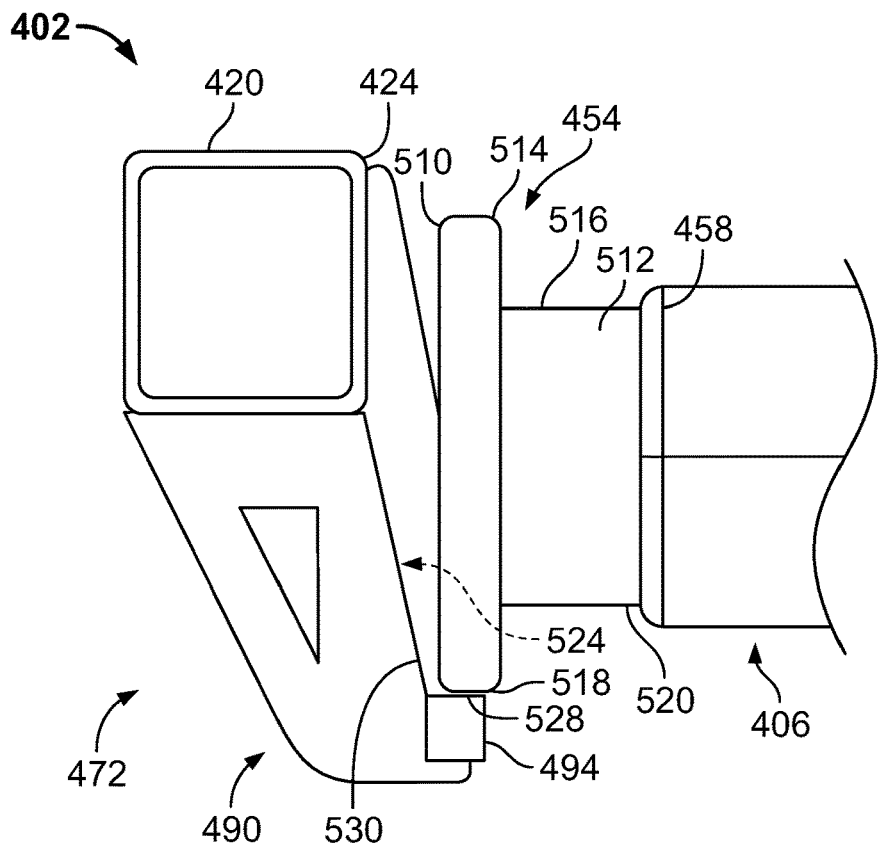
FIG. 13 is a left side detailed view of a first towing dolly assembly of the towing with some parts removed and a first engaging member of a first axle cradle tube of the towing dolly cradle assembly of FIG. 12.
Figure 14:
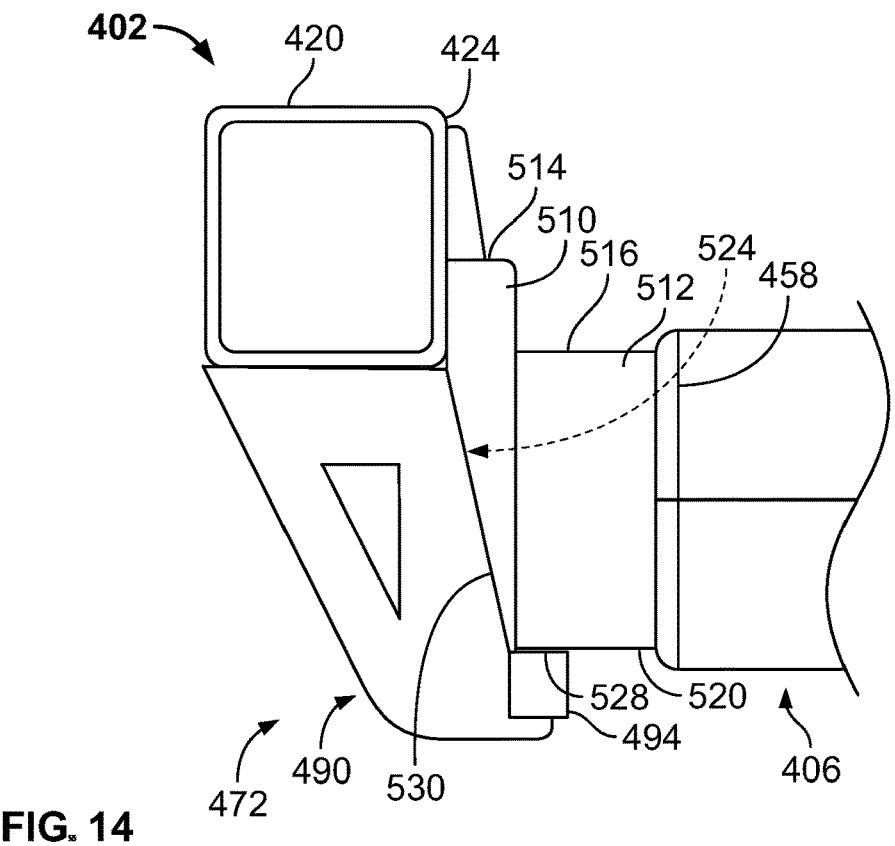
FIG. 14 is a left side detailed view of the first engaging member of the first axle cradle tube engaged with the first towing dolly assembly of FIG. 13.

Referring now to FIG. 13, in the illustrated embodiment, the first and second engaging members 454, 456, 462, 464 of the first and second axle cradle tubes 406, 408 include an engaging plate 510 arranged at an end of a base 512. The engaging plate 510 is configured to releasably engage the first and second crossbars 494, 496, 502, 504 of the first and second axle cradle assemblies 472, 474, 476, 478 of the first and second towing dolly assemblies 402, 404. More specifically, referring to the first cradle assembly 472 of the first towing dolly assembly 402 and the first engaging member 454 of the first axle cradle tube 406 shown in FIGS. 13 and 14, the engaging plate 510 has an upper end 514 that extends upwardly from an upper side 516 of the base 512 and a lower end 518 that extends downwardly from a lower side 520 of the base 512. As shown in FIGS. 12 and 13, the engaging plate 510 is configured to be inserted into one of a plurality of openings 524 defined by the plurality of mounting plates 490 of the first axle cradle assembly 472 such that the lower end 518 of the engaging plate 510 and the lower side 520 of the base 512 contact the first crossbar 494. Further, as shown in FIG. 14, the first engaging member 454 is configured such that the upper end 514 of the engaging plate 510 contacts the front side 424 of the beam 420 while the lower end 518 engages the first crossbar 494 of the first axle cradle assembly 472.

Referring again to FIG. 12, the towing cradle assembly 20 can be adjusted to accommodate first and second wheels 430, 438 of the first axle 432 of the automobile having varying diameters by moving the engaging plates 510 of the first and second axle cradle tubes 406, 408 to a different one of the plurality of openings 524 of the corresponding axle cradle assemblies 472, 474, 476, 478. As such, referring again to FIG. 13, the configuration of the first and second axle cradle assemblies 472, 474, 476, 478 of the first and second towing dolly assemblies 402, 404 is particularly beneficial because the engaging plates 510 of the first and second axle cradle tubes 406, 408 can be moved between the plurality of openings 524 of the axle cradle assemblies 472, 474, 476, 478 by lifting the first and second axle cradle tubes 406, 408 relative to the first and second towing dolly assemblies 402, 404. More specifically, as shown in FIG. 13, by lifting the first axle cradle tube 406 a small distance, the engaging plate 510 can be moved laterally along a top side 528 of the first crossbar 494 because front sides 530 of the plurality of mounting plates 490 do not contact the top side 528 of the first crossbar 494.

Referring again to FIG. 12, in some embodiments, the first and second axle cradle tubes 406, 408 can be configured such that a longitudinal length L of each of the first and second axle cradle tubes 406, 408 is adjustable. For example, in some embodiments, each of the first and second axle cradle tubes can include an inner tube having the first engaging members that is slidably arranged within an opening of an outer tube having the second engaging members, opposite the opening, such that a longitudinal length of the first and second axle cradle tubes is adjustable depending on the position of the inner tube within the outer tube. Accordingly, in the illustrated embodiment, the towing dolly assembly 400 can be adjustable to accommodate axles of varying lengths of various automobiles.

With the first and second axle cradle tubes 406, 408 engaged with the first and second towing dolly assembles 402, 408, the towing dolly cradle assembly 400 can be moved from the retracted configuration (as shown in FIG. 12) to an extended configuration (not shown), such as, for example, similar to the towing dolly assembly 20 of FIGS. 1-11 being moveable between the retracted configuration (as shown in FIGS. 1 and 3) and the extended configuration (as shown in FIGS. 2 and 4). More specifically, the first and second towing dolly assemblies 402, 404 can each be moved to the extended configuration from the retracted configured by a user, such as, for example, by inserting and leveraging a pry bar (not shown) in respective pry bar receivers 172, 198 of the first and second spindle assemblies 24, 26 of the towing dolly assembly 20 of FIGS. 1-11. Referring still to the towing dolly assembly 20 of FIGS. 1-11, after the lock pins of the first and second cam locks 58, 72 are moved to the retracted position, the pry bar can be used to rotate each of the first and second locking arms 56, 70 of the first and second spindle assembly 24, 26 downwardly about the first and second axes 66, 80 toward the first and second axle cradle assemblies 28, 30, respectively. Further, as the first and second locking arms 56, 70 are moved toward the extended configuration, the teeth of the ratchet gears 146, 188 progressively engage the ratchet case 142, 190 of the first and second ratcheting assemblies 138, 186, respectively, which permits a user to raise the towing dolly assembly 20 to an intermediary configuration (i.e., a configuration between the retracted and extended configurations). In the intermediary configuration, the first and second ratcheting assemblies 138, 186 holds the locking arms 56, 70 of the first and second spindle assemblies 24, 26 in place while the lock pins (e.g., 206) of the first and second cam locks 58, 72 in the intermediary position contact the lock pin guide opening (e.g., 118) of the second locking plates 90, 182.

With the towing dolly cradle assembly 400 in the intermediary configuration (i.e., with each of the first and second towing dolly assemblies 402, 404 being in the intermediary configuration), the releasably attached first and second axle cradle tubes 406, 408 engage the first axle 432 of the automobile and cause the first axle 432 of the automobile to be slightly raised off of the ground surface G such that the first and second wheels 430, 438 do not contact the ground surface G. Thus, by the towing dolly cradle assembly 400 being configured to be moveable to the intermediary configuration, a user can quickly move the automobile while the towing dolly cradle assembly 400 is in the intermediary configuration.

From the intermediary configuration (not shown), the towing dolly cradle assembly 400 can then be moved to the extended configuration (i.e., with each of the first and second towing dolly assemblies 402, 404 being in the extended configuration). Referring again to the towing dolly assembly 20 of FIGS. 1-11, from the intermediary configuration (not shown) a user can further rotate the first and second locking arms 56, 70 of the first and second spindle assemblies 24, 26 downwardly until the lock pins (e.g., 206) of the first and second cam locks 58, 72 engage the lock pin holes (e.g., 114) of the second locking plates 80, 182, which hold the first and second spindle assemblies in the extended configuration. With the towing dolly cradle assembly 400 in the extended configuration (i.e., with each of the first and second towing dolly assemblies 402, 404 being in the extended configuration), the releasably attached first and second axle cradle tubes 406, 408 engaged with the first axle 432 of the automobile cause the automobile to be raised further off of the ground surface G.

In some applications, multiple towing dolly cradle assemblies can be used to lift multiple axles of a vehicle to be towed from a ground surface. For example, an automobile having two axles (front and rear) can be lifted completely from a ground surface using a first towing dolly cradle assembly on the first axle and a second towing dolly cradle assembly on the second axle, an automobile having three axles can be lifted completely from a ground surface using three towing dolly cradle assemblies, etc.

The particular embodiments disclosed above is illustrative only, as the disclosure may be modified and practiced in different but equivalent manners apparent to those skilled in the art having the benefit of the teachings herein.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Thus, the disclosure is to cover all modifications, equivalents, and alternatives falling within the spirit and scope of the disclosure as defined by the following appended claims.

To apprise the public of the scope of this disclosure, the following claims are made:

What is claimed is:

1. A towing dolly assembly, comprising:
an elongated beam having a first end, a second end opposite the first end, and a longitudinal axis extending through the first and second ends;
a first spindle assembly arranged on the first end of the beam, the first spindle assembly including a first cam lock and a first locking arm;
a second spindle assembly arranged on the second end of the beam, the second spindle assembly including a second cam lock and a second locking arm;
a first axle cradle assembly arranged on the beam adjacent to the first end; and
a second axle cradle assembly arranged on the beam adjacent to the second end,
wherein the first and second cam locks are fixedly attached to a first side of the beam,
wherein the first and second axle cradle assemblies are fixedly attached to a second side of the beam, the second side being opposite the first side,
wherein the first and second locking arms are pivotably attached to the beam, such that the first locking arm is pivotable about a first axis that extends perpendicular to the longitudinal axis between the first and second sides of the beam, and the second locking arm is pivotable about a second axis that extends perpendicular to the longitudinal axis between the first and second sides of the beam, and
wherein the towing dolly assembly is configured to be moveable between a retracted configuration, in which the first and second locking arms are in a first position, and an extended configuration, in which the first and second locking arms are in a second position.

2. The towing dolly assembly of claim 1, wherein the first axle cradle assembly includes:
a plurality of mounting plates having first ends that are fixedly attached to the second side of the beam and second ends that are spaced downwardly from the first ends; and
a crossbar fixedly attached to first sides of the plurality of mounting plates and adjacent to the second ends of the plurality of mounting plates.

3. The towing dolly assembly of claim 2, wherein the first sides of the plurality of mounting plates extend downwardly from the first ends of the plurality of mounting plates, and wherein the first sides of the plurality of mounting plates do not contact a top side of the crossbar.

4. The towing dolly assembly of claim 2, wherein the plurality of mounting plates include at least two outer mounting plates arranged toward the first end of the beam and an inner mounting plate arranged adjacent to the outer mounting plates toward the second end of the beam.

5. The towing dolly assembly of claim 4, wherein the inner mounting plate includes a support leg that is configured to contact a third side of the beam, the third side being adjacent to the first side of the beam.

6. The towing dolly assembly of claim 4, wherein the inner mounting plate includes a crossbar channel that is configured to receive the crossbar and contacts at least a top side of the crossbar, and
wherein the outer mounting plates include crossbar protrusions that are configured to receive the crossbar such that the first sides of the outer mounting plates do not contact the top side of the crossbar.

7. The towing dolly assembly of claim 1, wherein the first and second cam locks are mounted directly on a surface of the first side of the beam.

8. The towing dolly assembly of claim 1, wherein the first spindle assembly further includes a first ratcheting assembly, the first ratcheting assembly being configured to releasably hold the first locking arm at an angle relative to the longitudinal axis of the beam between the first and second positions.

9. The towing dolly assembly of claim 1, wherein the first locking arm includes a first locking plate arranged on a third side of the beam that is adjacent to both the first and second sides of the beam and a second locking plate arranged on a fourth side of the beam that is opposite the third side.

10. The towing dolly assembly of claim 9, wherein the first cam lock is arranged such that a lock pin of the first cam lock faces toward the fourth side of the beam, the first cam lock being configured such that the lock pin is moveable between a retracted position and an extended position, and
wherein the second locking plate of the first locking arm includes:
a first opening arranged toward a first end of the second locking plate, the first opening being configured to receive the lock pin of the first cam lock in the extended position to releasably hold the first spindle assembly when the towing dolly assembly is in the extended configuration;
a second opening arranged between the first opening and a second end of the second locking plate opposite the first end and adjacent to a first side of the second locking plate, the second opening being configured to engage the lock pin of the first cam lock as the towing dolly assembly is moved between the retracted configuration and the extended configuration; and
a recess defined on a second side of the second locking plate opposite the first side, the recess being configured to receive the lock pin of the first cam lock in the extended position to releasably hold the first spindle assembly when the towing dolly assembly is in the retracted configuration.

11. The towing dolly assembly of claim 10, wherein the beam includes a first fastener opening extending along the first axis through the third and fourth sides of the beam,
wherein the first spindle assembly further includes a first fastener that is received by the first fastener opening of the beam, a first opening of the first locking plate, and a third opening of the second locking plate, such that the first and second locking plates of the first locking arm are pivotable about the first fastener, and
wherein the third opening of the second locking plate is arranged between the second opening and the second side of the second locking plate.

12. The towing dolly assembly of claim 11, wherein the second opening of the second locking plate is a curved slot having a radius centered on the third opening of the second locking plate.

13. The towing dolly assembly of claim 12, wherein the first opening of the first locking plate is arranged toward a first end of the first locking plate,
wherein the first locking plate further includes a second opening arranged toward a second end of the first locking plate opposite the first end,
wherein the second locking plate further includes a fourth opening arranged between the second end and the third opening of the second locking plate, and
wherein the first spindle assembly further includes a first axle, the first axle having a first portion that is received by the second opening of the first locking plate and the fourth opening of the second locking plate and a second portion that is configured to releasably receive a first wheel assembly of the towing dolly assembly.

14. The towing dolly assembly of claim 1, wherein the towing dolly assembly is a first towing dolly assembly and is part of a towing dolly cradle assembly including:
a second towing dolly assembly;
a first axle cradle tube having a first end, a second end opposite the first end, and a first longitudinal axis; and
a second axle cradle tube having a first end, a second end opposite the first end, and a second longitudinal axis,
wherein the first and second towing dolly assemblies are arranged opposing each other such that longitudinal axes of the beams of the first and second towing dolly assemblies are substantially parallel to each other, and the first and second axle cradle tubes are arranged between the first and second towing dolly assemblies such that the first and second longitudinal axes of the first and second axle cradle tubes are substantially perpendicular to the longitudinal axes of the beams of the first and second towing dolly assemblies,
wherein the first axle cradle tube includes a first engaging member arranged at the first end and a second engaging member arranged at the second end, the first engaging member being configured to releasably engage a first axle cradle assembly of the first towing dolly assembly, the second engaging member being configured to releasably engage a second axle cradle assembly of the second towing dolly assembly, and
wherein the second axle cradle tube includes a first engaging member arranged at the first end and a second engaging member arranged at the second end, the first engaging member being configured to releasably engage a second axle cradle assembly of the first towing dolly assembly, the second engaging member being configured to releasably engage a first axle cradle assembly of the second towing dolly assembly.

15. A towing dolly assembly comprising:
an elongated beam having a first end, a second end opposite the first end, a longitudinal axis extending through the first and second ends, an upper surface between the first and second ends, and a lower surface between the first and second ends;
a first locking arm pivotably mounted to the beam toward the first end;
a second locking arm pivotably mounted to the beam toward the second end; and
an axle cradle assembly arranged on the beam between the first and second ends,
wherein the first locking arm is pivotable about a first axis, the first axis located between the upper surface of the beam and the lower surface of the beam, the first axis extending through the beam transversely to the longitudinal axis and adjacent to the first end of the beam,
wherein the second locking arm is pivotable about a second axis, the second axis located between the upper surface of the beam and the lower surface of the beam, the second axis extending through the beam transversely to the longitudinal axis and adjacent to the second end of the beam, and
wherein the towing dolly assembly is configured to be moveable between a retracted configuration, in which the first and second locking arms are in a first position, and an extended configuration, in which the first and second locking arms are in a second position.

16. The towing dolly assembly of claim 15, further comprising:
a first cam lock fixedly attached directly to a surface of a first side of the beam toward the first end of the beam, the first cam lock being configured to engage the first locking arm; and
a second cam lock fixedly attached directly to the surface of the first side of the beam toward the second end of the beam, the second cam lock being configured to engage the second locking arm.

17. The towing dolly assembly of claim 15, wherein the axle cradle assembly includes:
a plurality of mounting plates, the plurality of mounting plates having first ends fixedly attached to a second side of the beam and second ends spaced downwardly from the first ends; and
a crossbar fixedly attached to first sides of the plurality of mounting plates adjacent to the second ends of the plurality of mounting plates,
wherein the first sides of the plurality of mounting plates extend downwardly from the first ends to a rear side of the crossbar, and
wherein the first sides of the plurality of mounting plates do not contact a top side of the crossbar.

18. The towing dolly assembly of claim 17, wherein the axle cradle assembly further includes:
a first axle cradle assembly arranged on the second side of the beam toward the first end of the beam; and
a second axle cradle assembly arranged on the second side of the beam toward the second end of the beam.

19. A towing dolly assembly comprising:
an elongated beam having a first end, a second end opposite the first end, and a longitudinal axis extending through the first and second ends;
a first spindle assembly arranged on the first end of the beam, the first spindle assembly including a first cam lock, a first locking arm, and a first ratcheting assembly;
a second spindle assembly arranged on the second end of the beam, the second spindle assembly including a second cam lock, a second locking arm, and a second ratcheting assembly;
a first axle cradle assembly arranged toward the first end of the beam, the first axle cradle assembly including a plurality of mounting plates having first ends fixedly attached to a second side of the beam and second ends spaced downwardly from the first ends, the first axle cradle assembly also including a first crossbar, the first crossbar being fixedly attached to first sides of the plurality of mounting plates adjacent to the second ends of the mounting plates; and
a second axle cradle assembly arranged toward the second end of the beam, the second axle cradle assembly including a plurality of mounting plates having first ends fixedly attached to the second side of the beam and second ends spaced downwardly from the first ends, the second axle cradle assembly also including a second crossbar, the second crossbar being fixedly attached to first sides of the plurality of mounting plates adjacent to the second ends of the plurality of mounting plates,
wherein the first sides of the pluralities of first and second mounting plates extend downwardly from the first ends to rear sides of the first and second crossbars, respectively,
wherein the first sides of the pluralities of first and second mounting plates do not contact top sides of the first and second crossbars, respectively,
wherein the first and second cam locks are fixedly attached directly to a surface of a first side of the beam opposite the second side, the first and second cam locks being configured to engage the first and second locking arms, respectively,
wherein the first and second locking arms are pivotably attached to the beam, the first locking arm being pivotable about a first axis and the second locking arm being pivotable about a second axis, the first axis extending perpendicular to the longitudinal axis between the first and second sides of the beam and toward the first end of the beam, the second axis extending perpendicular to the longitudinal axis between the first and second sides of the beam and toward the second end of the beam,
wherein the towing dolly assembly is configured to be moveable between a retracted configuration, in which the first and second locking arms are in a first position, and an extended configuration, in which the first and second locking arms in a second position, and
wherein the first and second ratcheting assemblies are configured to releasably hold the first and second locking arms, respectively, at an angle relative to the longitudinal axis of the beam between the first and second positions.

20. The towing dolly assembly of claim 19, wherein the plurality of mounting plates of the first axle cradle assembly comprise at least two outer mounting plates arranged toward the first end of the beam, the first axle cradle assembly further comprising an inner mounting plate arranged toward the second end of the beam,
wherein the plurality of mounting plates of the second axle cradle assembly comprise at least two outer mounting plates arranged toward the second end of the beam, the second axle cradle assembly further comprising an inner mounting plate arranged toward the first end of the beam, and wherein the inner mounting plates of the first and second axle cradle assemblies include a support leg and a crossbar channel, the support leg being configured to contact a third side of the beam that is adjacent to the second side of the beam, each crossbar channel being configured to receive a respective one of the crossbars and contact at least the top side of the respective one of the crossbars.

\* \* \* \* \*